(12) United States Patent  (10) Patent No.: US 7,719,830 B2
Howarth et al.  (45) Date of Patent: May 18, 2010

(54) UNIVERSAL DOCKING STATION FOR HAND HELD ELECTRONIC DEVICES

(75) Inventors: Richard P. Howarth, San Francisco, CA (US); Phillip M. Hobson, Menlo Park, CA (US); Wim Crooijmans, San Jose, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 11/125,883

(22) Filed: May 9, 2005

(65) Prior Publication Data

US 2006/0250764 A1    Nov. 9, 2006

(51) Int. Cl.
*H05K 7/12* (2006.01)
(52) U.S. Cl. .............. 361/679.41; 361/679.56; 361/727; 312/223.2
(58) Field of Classification Search ........... 361/683, 361/686, 679.56, 679.41, 727; 710/303; 312/223.2
See application file for complete search history.

(56) References Cited

U.S. PATENT DOCUMENTS

| D328,277 | S | 7/1992 | Leman et al. |
| D336,631 | S | 6/1993 | Ivester |
| 5,233,281 | A | 8/1993 | Chiang et al. |
| 5,357,185 | A | 10/1994 | Chen |
| 5,552,959 | A * | 9/1996 | Penniman et al. ...... 361/679.41 |
| D388,764 | S | 1/1998 | Bartling et al. |
| 5,898,290 | A | 4/1999 | Beard et al. |
| D409,987 | S | 5/1999 | Okumura |
| D411,166 | S | 6/1999 | Uemura et al. |
| D416,536 | S | 11/1999 | Ross et al. |
| D419,160 | S | 1/2000 | Davidson et al. |
| 6,042,414 | A * | 3/2000 | Kunert ............... 439/374 |
| D422,556 | S | 4/2000 | Okura et al. |
| 6,115,247 | A | 9/2000 | Helot |
| 6,193,546 | B1 | 2/2001 | Sadler |
| D439,908 | S | 4/2001 | Gozani |
| D440,542 | S | 4/2001 | Hawkins et al. |
| D444,121 | S | 6/2001 | Chun et al. |
| D444,124 | S | 6/2001 | Casey et al. |
| D450,707 | S | 11/2001 | Francavilla et al. |
| D454,332 | S | 3/2002 | Yokoyama |
| 6,394,300 | B1 | 5/2002 | Bosy |

(Continued)

FOREIGN PATENT DOCUMENTS

| EP | 1 104 150 | 5/2001 |
| WO | WO 00/60450 | 10/2000 |
| WO | WO 2004/084413 A2 | 9/2004 |

OTHER PUBLICATIONS

"iPod Dock Cradle", downloaded Apr. 11, 2003, www.bookendzdocks.com/bookendz/dock_cradel.htm.

(Continued)

*Primary Examiner*—Jayprakash N Gandhi
*Assistant Examiner*—Ingrid Wright
(74) *Attorney, Agent, or Firm*—Townsend and Townsend and Crew LLP

(57) ABSTRACT

A docking station is disclosed. The docking station has an adjustable opening that accommodates portable electronic devices with differing sizes and shapes. The opening is capable of expanding to accommodate larger devices and retracting to accommodate smaller devices while still supporting the portable electronic device in its proper position within the docking station.

33 Claims, 15 Drawing Sheets

U.S. PATENT DOCUMENTS

| | | | |
|---|---|---|---|
| D459,299 S | 6/2002 | Hughes et al. | |
| D461,476 S | 8/2002 | Evers et al. | |
| D463,361 S | 9/2002 | Ruohonen | |
| D466,122 S | 11/2002 | Moody | |
| 6,483,698 B1 | 11/2002 | Loh | |
| D468,305 S | 1/2003 | Ma et al. | |
| 6,524,240 B1 | 2/2003 | Thede | |
| D472,900 S | 4/2003 | Matsumoto | |
| D495,336 S | 8/2004 | Andre et al. | |
| 6,798,647 B2 | 9/2004 | Dickie | |
| 6,813,528 B1 | 11/2004 | Yang | |
| 6,898,080 B2 | 5/2005 | Yin et al. | |
| 6,961,237 B2 * | 11/2005 | Dickie | 361/683 |
| 6,994,575 B1 | 2/2006 | Clark et al. | |
| 2002/0024794 A1 | 2/2002 | Lin et al. | |
| 2002/0032042 A1 | 3/2002 | Poplawsky et al. | |
| 2002/0103008 A1 | 8/2002 | Rahn et al. | |
| 2002/0163780 A1 | 11/2002 | Christopher | |
| 2002/0173273 A1 | 11/2002 | Spurgat et al. | |
| 2003/0097379 A1 | 5/2003 | Ireton | |
| 2003/0148740 A1 | 8/2003 | Yau et al. | |
| 2003/0198015 A1 | 10/2003 | Vogt | |
| 2004/0195305 A1 | 10/2004 | Dotson | |
| 2004/0267825 A1 | 12/2004 | Novak et al. | |
| 2006/0013411 A1 * | 1/2006 | Lin | 381/87 |
| 2006/0161713 A1 * | 7/2006 | Belady | 710/303 |
| 2006/0181840 A1 * | 8/2006 | Cvetko | 361/679 |

OTHER PUBLICATIONS

"BookEndz Home Page.", downloaded Apr. 11, 2003, www.bookendzdocks.com/bookendz/index.htm.

"Atech Flash Technology Iduo Ipod Dock and card Reader", www.the-gadgeteer.com, downloaded Nov. 21, 2005.

U.S. Appl. No. 29/220,258 entitled "Stand" filed Dec. 23, 2004.

European Search Report dated Aug. 17, 2007 from EP Application No. 04 76 0202.

International Search Report dated May 21, 2007 from PCT Application No. PCT/US2006/048670.

International Search Report dated March 6, 2007 from PCT Application No. PCT/US2006/003096.

Sinitsyn, Alexander, "A Synchronization Framework for Personal Mobile Servers," Pervasive Computing and Communications Workshops (PERCOMW'04). Proceedings of the Second IEEE Annual Conference, Piscataway, NJ, USA, IEEE, Mar. 14, 2004, pp. 208-212.

International Search Report dated Aug. 21, 2006 from corresponding International Application No. PCT/US2006/016770 with Written Opinion.

U.S. Appl. No. 10/423,490 entitled "Media Player System", filed Apr. 25, 2003.

* cited by examiner

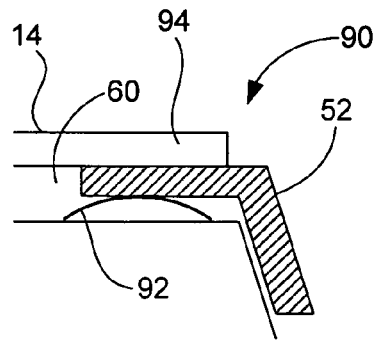
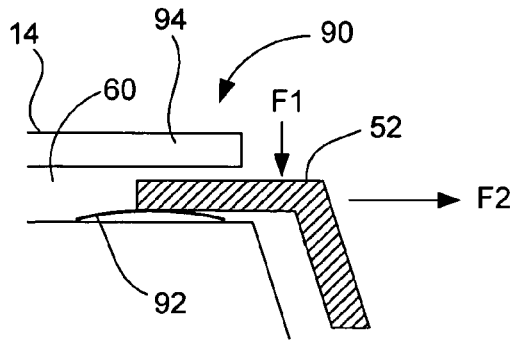
FIG. 5A      FIG. 5B
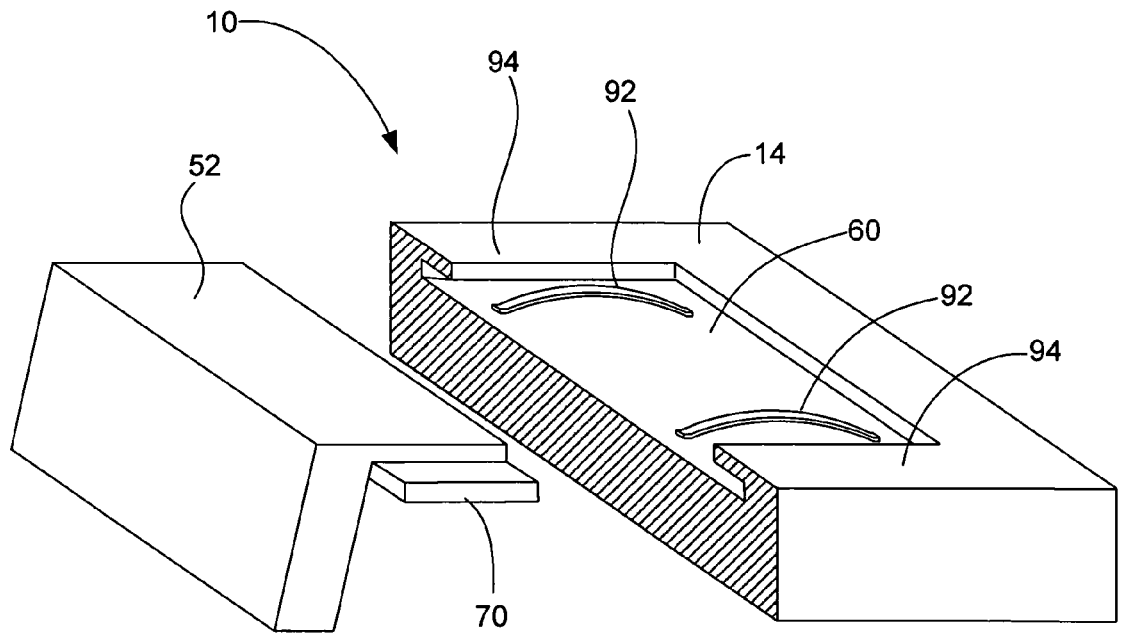
FIG. 5C

UNIVERSAL DOCKING STATION FOR HAND HELD ELECTRONIC DEVICES

CROSS REFERENCE TO RELATED APPLICATIONS

This application is related to U.S. patent application Ser. No. 10/423,490, filed Apr. 25, 2003, and entitled "MEDIA PLAYER SYSTEM" which is hereby incorporated herein by reference.

BACKGROUND OF THE INVENTION

1. Field of the Invention

The present invention relates generally to docking stations for hand held electronic devices. More particularly, the present invention relates to a docking station with an opening that accommodates hand held electronic devices with different sizes and shapes.

2. Description of the Related Art

There exist today many styles of handheld electronic devices as for example cellular phones, personal digital assistants (PDA), media players (e.g., music player or video player), cameras, game player and the like. As is generally well known, these devices come in various shapes and sizes (e.g., thickness, width and height). The size and shape is typically dependent on various form factors including but not limited to ease of use, ergonomics, aesthetics, and the size of the components inside or outside the device. While it is likely that different manufacturers may produce the same type of hand held electronic device with differing shapes and sizes, it is also likely that one particular manufacturer may produce different models of the same type of hand held electronic device with different shapes and sizes.

By way of example, the iPod product line, which is manufactured by Apple Computer of Cupertino, Calif. comes in various sizes and shapes. Particularly, the iPod Mini has a pill shaped cross section and dimensions of 2.0×3.6×0.5 inches for 4 GB versions, while the standard iPod has a substantially rectangular cross and dimensions of 2.4×4.1×0.57 inches for a 20 GB version and 2.4×4.1×0.69 inches for a 40 GB version. Furthermore, the iPhoto model of the iPod has a substantially rectangular cross section similar to the standard version, but with dimensions of 2.4×4.1×0.75 for both 40 GB and 60 GB versions.

Many hand held electronic devices include a docking station for providing a convenient interface for transferring data between the device and computing devices such as a personal computers or peripheral devices such as speakers, monitors and printers without having to reconnect and disconnect cables. The docking station may also include an interface for connecting to a power source so that the hand held electronic device can be powered or charged (e.g., battery). In most cases, the docking stations include a slot within which the hand electronic device is received. The slot is configured to have a size and shape that coincides with the size and shape of the hand held device so that the hand held device rests snuggly within the slot. Furthermore, the slot typically includes a connector therein for operatively engaging a port of the hand held electronic device when the hand held electronic device is positioned within the slot. The connector is typically coupled to the external systems (e.g., computer, power source) through a cable so that communications between the hand held electronic device and the external systems can take place.

Because the slot has a size and shape that coincides with the size and shape of a particular hand held device, the docking station is typically dedicated to the particular handheld device. Other devices typically cannot be used with the docking station. The slots themselves are simply incapable of supporting more than one device. As a result, users with an arsenal of devices have to wield a variety of docking stations, one for each device in their arsenal. This produces clutter and can be confusing to the user. This also presents problems to the manufacturer of multiple devices in that they need to produce a variety of docking stations (one for each unique device), which adds costs and complexity in the design, manufacture, assembly, and packaging of the devices. This is especially true with devices in the same product line as for example the iPod described above.

Some docking stations come packaged with removable spacers that can change the size and shape of the slot thereby accommodating more than one device.

Furthermore, in recent years, skins have been created in order to produce more attractive and personalized hand held electronic devices. The skins, which include patterns and various colors, are placed over and in some cases adhered to the outside surfaces of the hand held electronic device. While skins do enhance the look of the hand held devices, they also tend to increase the size of the handheld electronic (and in some cases the shape), and as a result the hand held electronic device no longer fits into the slot of the docking station even when removable spacers are used.

Even if the skin is very thin, the hand held electronic device may have to be forced into and out of the slot due to tolerances between the hand held electronic device and the slot. Again, the slot of the docking station is typically designed for one particular shape and size. If the skin is permanently attached, the docking station can no longer be used. If the skin is removable, then the user must remove the skin in order to use the docking station. Both of these situations typically leave a negative impression on the user. The same problem arises when using protective covers and cases.

An improved docking station that can overcome the above stated problems is therefore desired. In particular, a docking station that can universally accept and support multiple handheld device of various shapes and sizes.

SUMMARY OF THE INVENTION

The invention relates, in one embodiment, to a universal docking station. The universal docking station includes a base having an opening that is partially recessed in the base. The opening is configured to receive a hand held electronic device. The opening includes an interface that operatively couples the hand held electronic devices to the docking station when the hand held electronic device are inserted into the opening. The universal docking station also includes one or more adjustable members that have the ability to change the dimensions of the opening. The adjustable members expand the opening outwardly to accommodate larger hand held devices and retract the opening inwardly to accommodate smaller devices.

The invention relates, in another embodiment, to a universal docking station. The docking station includes a base including a recess that forms an opening for receiving a handheld device. The recess has sides that surround the sides of the handheld device when the handheld device is received by the opening. The docking station also includes one or more adjustable members disposed at least partially within the recess. The adjustable members have the ability to change the size and shape of the opening for handheld devices of various sizes and shapes.

The invention relates, in another embodiment, to a universal docking station for a handheld device. The universal docking station includes a base with a recess. The universal docking station also includes at least one sliding member at least partially located within the recess. The sliding member is configured to slide relative to the base along a first axis. The sliding member slides between a retracted position that forms a large opening in the recess for receiving larger handheld devices, and an expanded position that forms a small opening in the recess for receiving smaller handheld devices.

The invention relates, in another embodiment, to a universal docking station. The universal docking station includes a first adjustable member located on a first side of an opening and a second adjustable member located on a second side of the opening. The second side is opposite the first side. The first and second adjustable members cooperate to adjust the size of the opening in order to accommodate handheld electronic devices of various sizes.

The invention relates, in another embodiment, to a sound system. The sound system includes a base with an integrated universal docking station. The docking station is configured to receive handheld music players. The universal docking station includes an adjustable opening for accommodating handheld music players of various sizes and shapes. The sound system also includes one or more speakers connected to the base.

BRIEF DESCRIPTION OF THE DRAWINGS

The invention may best be understood by reference to the following description taken in conjunction with the accompanying drawings in which:

FIGS. 5A and 5B are side elevation views, in cross section, of a universal docking station including a locking mechanism, in accordance with one embodiment of the present invention.

FIG. 5C is a broken away perspective diagram of the universal docking station shown in FIGS. 5A and 5B, in accordance with one embodiment of the present invention.

DETAILED DESCRIPTION OF THE INVENTION

The present invention relates generally to a docking station for portable electronic devices. The docking station provides a platform for quickly and easily coupling a portable electronic device such as a hand held electronic device to another system or device as for example a computer, a power source, or peripheral devices such as a monitor, a keyboard, speakers, etc.

The docking station may be a stand alone unit that communicates with other devices or systems through wired (e.g., cables) or wireless (e.g., Bluetooth) connections, or alternatively, the docking station may be integrated directly into the other devices or systems. In either case, the docking station includes an opening or slot that receives the portable electronic device. The opening is typically configured to support the portable electronic device in an upright (e.g., generally vertical) or generally laid down (e.g., horizontal) position while maintaining access to the U.I. portion of the portable electronic device.

The dock also includes a way of interfacing the portable electronic device with the other devices or systems. By way of example, the opening may include one or more connectors that engage one or more ports on the portable electronic device when the portable electronic device is placed in the opening. In the case of a stand alone unit, the connector may be coupled to other connectors, ports or transceivers that provide external connections to the other devices or systems. In the case of an integrated docking station, the connector may be wired directly to the components of the host device.

More particularly, the present invention relates to docking stations having an adjustable opening that accommodates portable electronic devices with differing sizes and shapes.

The opening is capable of expanding to accommodate larger devices and retracting to accommodate smaller devices while still supporting the portable electronic device in its proper position. This feature can be accomplished with a variety of mechanisms including but not limited to sliding members, bending members, conforming members, rotating or pivoting members, and the like.

Embodiments of the invention are discussed below with reference to FIGS. 1-21. However, those skilled in the art will readily appreciate that the detailed description given herein with respect to these figures is for explanatory purposes as the invention extends beyond these limited embodiments.

Figure 1:
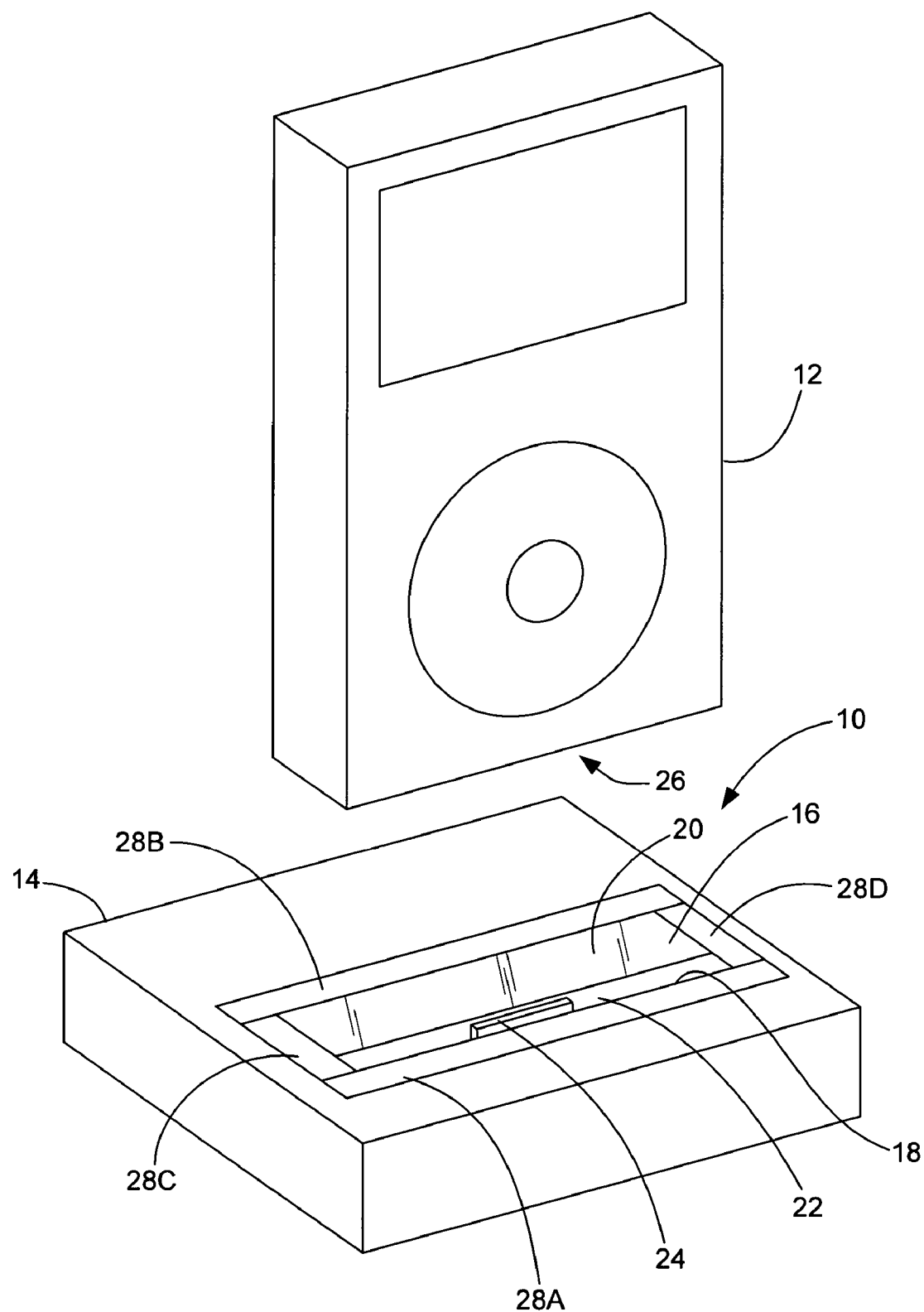
FIG. 1 is a perspective diagram of a universal docking station, in accordance with one embodiment of the present invention.

FIG. 1 is a perspective diagram of a universal docking station 10, in accordance with one embodiment of the present invention. By universal, it is generally meant that the docking station 10 can accommodate hand held electronic devices 12 of various sizes and shapes. For example, the universal docking station 10 may be configured to accept each of the iPods mentioned above. Although this particular embodiment is directed at stand-alone units, it should be appreciated that this is not a limitation and that the invention can be applied to integrated units as well as for example on top of a computer or speaker unit.

As shown, in the illustrated example, the universal docking station 10 includes a base 14 and an opening or slot 16 that is partially recessed in the top surface of the base 14. The base 14 is configured to enclose internally various electrical and structural components. The base 14 is also configured to define the shape or form of the docking station 10. The shape may for example be substantially rectangular (as shown) or alternatively the shape may be circular, cubical and the like. Furthermore, the base 14 may be formed by one or more housing components. For example, the base 14 may include an upper housing and a lower housing that are attached using any suitable technique including for example screws, bolts, snaps, adhesives, latches, etc.

Although the opening 16 can be configured to receive any side of the hand held electronic device 12, in this particular embodiment the opening 16 is configured to receive a bottom end of the hand held electronic device 12 so as to support the hand held electronic device 12 in an upright position when the hand held electronic device 12 is inserted in the recessed opening 16. The shape and size of the opening 16 is generally configured to coincide with the shape and size of the bottom end of the hand held electronic device 12. That is, the inner peripheral surfaces of the openings 16 are sized and dimensioned to receive the outer peripheral surface of the hand held electronic device 12. In some cases, the forward and rearward walls 18 and 20 of the opening 16 are angled so as to place the hand held electronic device 12 in an inclined position when the hand held electronic device 12 is disposed inside the opening 16 in the base 14. By way of example, the walls 18 and 20 may be sloped in a manner that tilts the hand held electronic device. For example, the device may be tilted between about 5 to about 25 degrees and more particularly about 15 degrees.

Located within the opening 16 is an interface 22 that operatively couples the hand held electronic devices 12 to the docking station 10. The interface may be widely varied. In the illustrated embodiment, the interface 22 includes one or more electrical connectors 24 that engage one or more electrical ports 26 on the bottom side of the hand held electronic devices 12. For example, the hand held electronic device 12 may include a female port and the docking station 10 may include a male plug that is inserted into the female port. The male plug is generally dimensioned for a tight fit within the port so as to secure the connection between the hand held electronic device 12 and the docking station 10 (e.g., friction coupling). Furthermore, the plugs and ports typically include pins or contacts that come together to allow electrical transmissions therebetween. The electrical connection may be configured to transfer data and/or power between the hand held electronic devices 12 and the docking station 10. In one implementation, a single connector capable of transferring both data and power is used.

The connector 24 is typically parallel to the walls 18 and 20 so that proper engagement can occur when the hand held electronic device 12 is inserted into the opening 16 (e.g., upright or tilted depending on slope of opening). As should be appreciated, the walls 18 and 20 serve as guides for placing the port and connector in the correct engagement position.

In accordance with one embodiment of the invention, the base 14 includes one or more adjustable members 28 that have the ability to change the size and/or shape of the opening 16 for any number of hand held electronic devices 12 of various shapes and sizes (e.g., width and thickness). For example, the adjustable members 28 may expand outwardly to create an opening 16 that accommodates larger hand held devices 12 and they may retract inwardly to create an opening 16 that accommodates smaller hand held devices 12. This good fit may exist along any one axis of the device or along both the width and length of the base of the device, or along any other axes that are intended to be seated in the base. By accommodating, it is generally meant that the size and/or shape of the opening 16 substantially conforms to the size and/or shape of the hand held electronic device 12 being placed in the opening 16 so as to produce a good fit therebetween.

The adjustable member(s) 28 may be one continuous piece or they may be segmented into multiple pieces. Furthermore, the adjustable member(s) 28 may be located on only one side of the opening 16 or they may be located on multiple sides of the opening 16. In the illustrated embodiment, the docking station 10 includes adjustable members 28A-D that are segmented and located at each side of the opening 16. In so doing, each of the adjustable members form at least a portion of the walls that surround the opening (e.g., 18 and 20). The adjustable members 28A and 28B, which are in an opposed relationship, move inwardly and outwardly in the x direction while the adjustable members 28C and 28D, which are also in an opposed relationship, move inwardly and outwardly in the y direction so as to open and close the opening 16 for the various sizes and shapes of the hand held electronic devices 12.

The manner in which the adjustable members 28 retract and expand may be widely varied. The adjustable members 28 may for example correspond to sliding members that slide outwardly in order to expand the opening 16 and that slide inwardly in order to retract the opening 16. Alternatively or additionally, the docking station 28 may include rotating members, pivoting members, flexing members, conforming members, and/or the like in order to expand and retract the opening 16.

Figure 2:
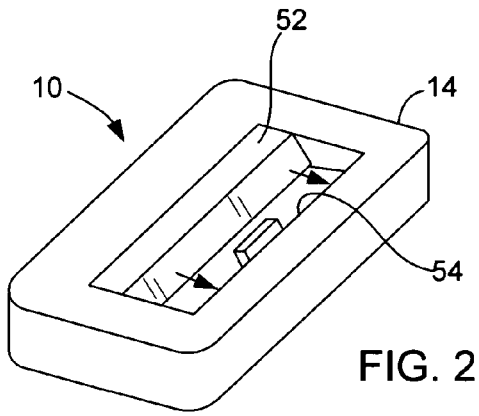
FIG. 2 is a perspective diagram of a universal docking station, in accordance with one embodiment of the present invention.

Referring to FIGS. 2 and 3, one embodiment of the universal docking station 10 will be described in greater detail. In this particular embodiment, the universal docking station 10 includes a single moving member 52 that moves relative to the base 14. The movable member 52 is typically movably retained to the base 14 although in some cases it may float thereon. The moving member 52 may for example be slidably attached to the base 14. As shown, the single moving member 52 is positioned on one side of the opening 16, and is configured to move linearly in a direction towards the opposing side 54 in order to adjust the distance of the opening 16 between the moving member 52 and the opposing side 54 that is fixed. Once the distance is set, the moving member 52 along with the opposing side 54 provide reference surfaces 56 and 58 for the front and back of the hand held electronic device 12 when the hand held electronic device 12 is inserted into the opening 16. In some cases, the position of the reference surfaces 56 and 58 even help align the port 26 of the hand held electronic device 12 with the connector 24 of the docking station 10. Although the moving member 52 is shown spanning the entire side, it should be noted that this is not a limitation and that the moving member 52 may only span a portion of the side.

Figure 3A:
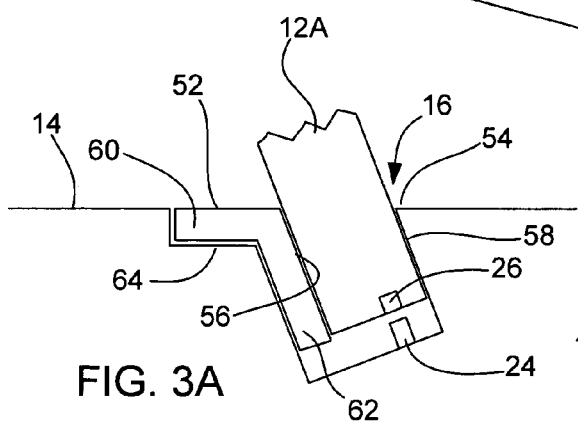
FIGS. 3A and 3B are side elevation views, in cross section, of the universal docking station shown in FIG. 2, in accordance with one embodiment of the present invention.
Figure 3B:
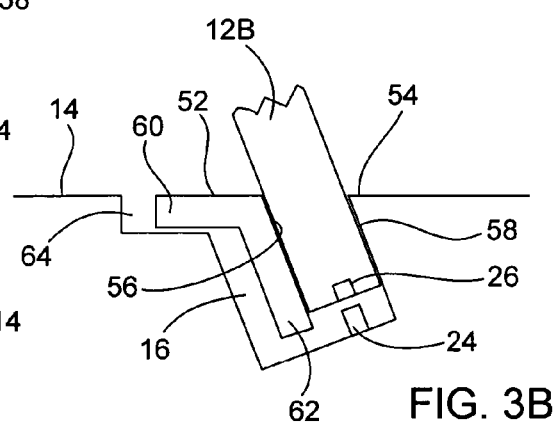

In the illustrated embodiment, the moving member 52, spans the width of the opening 16, and is configured to move forwards and backwards in order to accommodate hand held electronic devices 12 with varying thicknesses. As shown in FIGS. 3A and 3B, the moving member 52 is capable of translating between a most rearward position (FIG. 3A), which sets the maximum distance for the opening 16, and a most forward position (FIG. 3B), which sets the minimum distance for the opening 16. The maximum distance may correspond to the thickness of the largest hand held electronic device 12 including those devices with skins. The minimum distance may correspond to the thickness of the smallest hand held electronic device 12. Alternatively, the moving member 52 may move completely to the opposite side 54 in order to accommodate the thinnest of hand held electronic devices.

The moving member 52 may be widely varied. In the illustrated embodiment, the moving member 52 takes the form of a flange having a substantially horizontal upper section 60 and a substantially vertical lower section 62. The upper section 60 is seated within a recessed portion 64 in the top surface of the base 14 next to the opening 16 and the lower section 62 extends into the opening 16. The lower section 62 typically drapes around the back wall of the opening 16 and in so doing forms a new back wall of the opening 16. The recess 64 is sized and dimensioned to accommodate the upper section 60 of the flange, and the opening 16 is sized and dimensioned to accommodate the lower section 62 of the flange and the various hand held electronic devices 12, i.e., the distance between the front and back of the opening is oversized so that there is room for the lower section and the various devices.

For aesthetic reasons, the top surface of the moving member 52 is substantially flush with the top surface of the base 14. Alternatively, the top surface of the moving member 52 may be recessed below or protrude above the top surface of the base 14. Furthermore, the lower section 62 may have various lengths although longer lengths are preferred so as to provide greater support and a larger reference surface 56 for receiving the back surface of the hand held electronic devices 12 when the hand held electronic devices 12 are inserted into the opening 16. In addition, the reference surface 56 of the lower section 62 may be upright or it may be angled (as shown). Angled is typically preferred so as to position the hand held electronic devices 12 in a better position for use (e.g., tilted). The angle is similar to the angle of the front reference surface 58 so that the opening 16 provides a uniform distance therebetween from the top to the bottom of the opening 16.

Figure 4A:
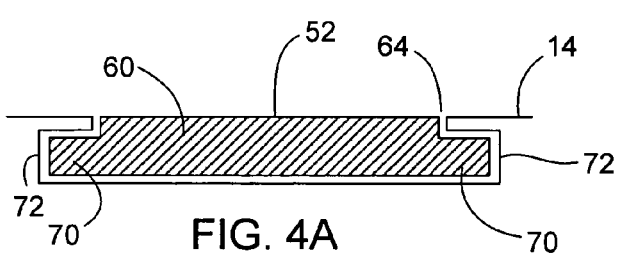
FIGS. 4A-4C are various front views, in cross section, of the universal docking station shown in FIGS. 3A and 3B, in accordance with several embodiments of the present invention.
Figure 4B:
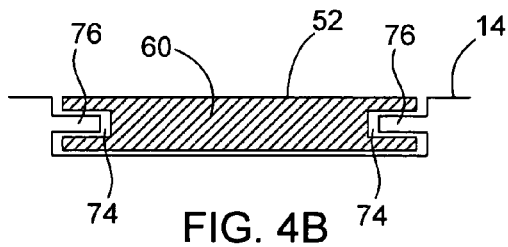
Figure 4C:
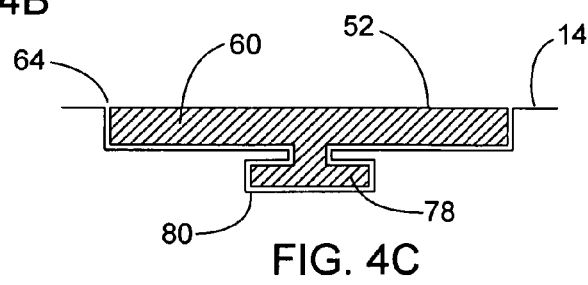

In one embodiment, the moving member 52 is slidably retained within the recess 64 on the top surface of the base 14. This may be accomplished in a variety of ways. FIGS. 4A-4C show several examples of sliding interfaces that can be used. In all of these embodiments, the interface helps keep the moving member 52 retained to the base 14.

In FIG. 4A, the moving member 52 includes tabs 70 on each side of the upper section 60. The tabs 70 are trapped between a channel 72 formed by an upper and lower surface of the base 14 at the sides of the recess 64. The tabs 70 may span the entire upper section 60 or it may only span a portion of the upper section 60. In one implementation, the tabs 70 may be individual pins that glide through the channels 72. This type of arrangement gives the moving member the ability to pivot about the pins thus enhancing engagement with the back surface of the hand electronic devices 12. For example, the moving member can pivot about the y axis in order to place the reference surface flush with the back surface of the hand held electronic device 12.

In FIG. 4B, the moving member 52 includes a channel 74 that receives tabs 72 extending out of the base 14. This embodiment is opposite the embodiment shown in FIG. 4A.

In FIG. 4C, the moving member 52 includes a flange 78 on its bottom surface. The flange 78 is configured to slide in a channel 80 located in the top surface of the recess 64. Depending on the shape of the lower flange portion, the moving member 52 may be configured to rotate about the z axis thus enhancing engagement with the back surface of the hand electronic devices 12 (e.g., it can adjust). In some cases, the lower flange portion of the flange 78 is a pin so that moving member 52 also provides the pivoting action described above.

In another embodiment, the docking station 10 includes a locking device for holding the position of the moving member 52 once the desired position is found. That is, the locking device helps secure the moving member 52 between the maximum and minimum distances so that the opening 16 is set for a particular hand held electronic device 12. The locking device may correspond to rudimentary devices such as bolts and screws that are connected to both the moving member 52 and the base 14 or to pins that are inserted into holes in both the moving member 52 and the base 14 thereby preventing the moving member 52 from moving relative to the base 14. The locking device may also include snaps, detents, flexures or magnets in order to hold the moving member 52 in a fixed location. The locking device may also correspond to more complex mechanisms such as quick release locking mechanisms that enable a user to easily and quickly secure and release the moving member 52 to and from the base 14. That is, the moving member 52 may be locked in position by pushing or pulling a button or knob, or by a simple flick of a latch or handle.

FIG. 5A-5C show one example of a quick release locking device 90. In this particular embodiment, the locking device 90 includes one or more leaf springs 92 that are located within the recess 64 of the base 14. In the illustrated embodiment, the locking device 90 includes a pair of leaf springs 92 that placed on opposed sides relative to the center of the moving member 52. Furthermore, the moving member 52 is slidably retained in the recess 64 as for example in a manner similar to FIG. 4A. The moving member 52 is therefore capable of sliding back and forth within the recess 64. The leaf springs 92 provide a force that pushes the moving member 52 against the top wall 94 of the base 14 thus securing it in place. In order to slide the moving member 52, a force F1 is applied on the top of the moving member 52 against the force exerted by the leaf springs 92. This releases the moving member 52 from the top wall 94 of the base 14. The moving member 52 can therefore be slid freely to its desired position by applying a translating force F2. Once the forces are removed, the force provided by the leaf springs 92 push the moving member 52 against the top wall 94 of the base 14 thereby securing the moving member 52 in place (e.g., via a friction force).

In some cases, the top wall 94 and tabs 70 include detents that engage one another to help hold the moving member in place once the tabs 70 are forced against the top wall 94. The position of the detents may be set at random increments or the position may corresponding to positions that create openings that fit the various hand held electronic devices to be used in the docking station.

It should be noted that the quick release locking device shown in FIG. 5 is not a limitation and that other mechanisms may be used. For example, the docking station may include a quick release latch mechanism for lockably engaging the moving member to the base. By locking the moving member relative to the base, the moving member is held substantially in place. The quick release latching mechanism generally includes a base side feature and moving member side feature that engage one another to hold the moving member in place. The mating features may for example include nubs, grooves, channels, catches, hooks, flanges, slots, guides, and friction couplings. The quick release latching mechanism also includes a latch, knob or button for urging the mating features into engagement and disengagement. For example, a latch located on the base may be configured to trap or capture a mating feature located on the moving member in order to hold the moving member in place.

In another embodiment, the docking station 10 includes a positioning mechanism for driving the moving member 52 back and forth between the forward and back positions rather than relying on the force from a finger as in FIGS. 4A and 4B. The driving mechanism can be implemented through mechanical means such as gears, belts and threads and/or electrical means such as linear actuators or motors.

Figure 6:
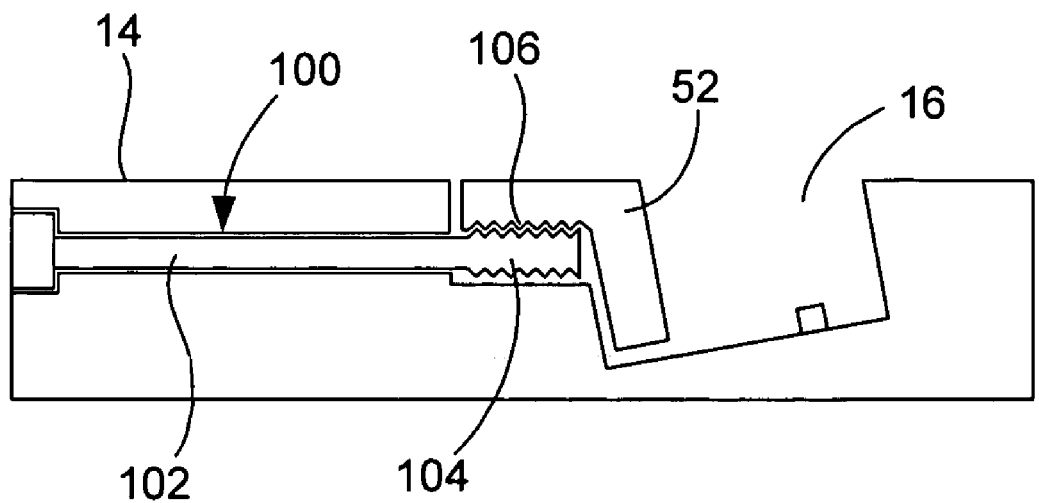
FIG. 6 is a side elevation view, in cross section, of a universal docking station including a positioning mechanism, in accordance with one embodiment of the present invention.

FIG. 6 shows one example of a driving mechanism 100 that can be used with the docking station 10 to drive the moving member 52 to its various positions. In this particular embodiment, the drive mechanism 100 consists of a bolt or screw 102 that is rotationally coupled to a portion of the base 14. The bolt 102 includes threads 104 that engage threads 106 located on the moving member 52. When the bolt 102 is rotated, the threads 104 on the bolt 102 move against the threads 106 on the moving member 52. Because the bolt 102 is attached to the base 14, and because the moving member 52 moves relative to the base 14, the moving member 52 is caused to move in the linear direction when the bolt 102 is rotated (e.g., the threads of the moving member are forced to move backwards and forwards along the bolt). By way of example, the moving member 52 may move in the forward direction when the bolt 102 is rotated clockwise and the moving member 52 may move in the reverse direction when the bolt 102 is rotated counterclockwise (or vice versa). In most cases, the bolt 102 is rotated via a knob or a tool such as a screwdriver. For example, the head of the bolt may include a groove for receiving the end of the screw driver. In either case, the actuator (e.g., knob or head) is typically placed at the surface of the base 14 (as shown).

In another embodiment, the docking station 10 includes one or more spring elements for biasing the moving member 52. The spring element may for example exert a force on the moving member 52 in the forward direction. The spring element may be widely varied. For example, the spring element may correspond to springs such as tension, compression, and leaf springs, flexures, or deforming springs such as a rubber post.

Figure 7:
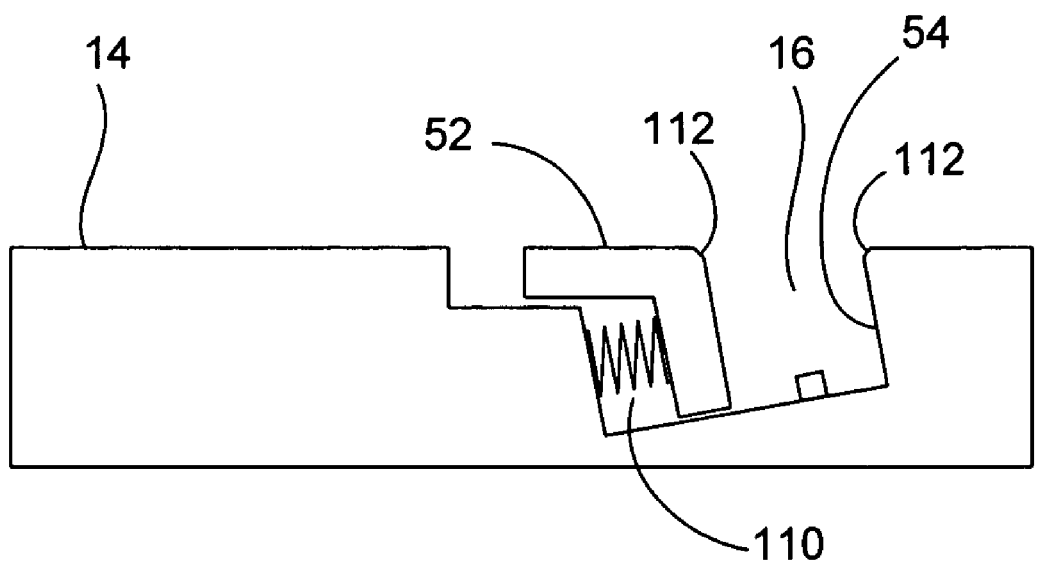
FIG. 7 is a side elevation view, in cross section, of a universal docking station including a biasing mechanism, in accordance with one embodiment of the present invention.

FIG. 7 shows one example of a spring element 110 that is disposed between the moving member 52 and the back wall of opening 16. The spring element 110 in the form of a compression spring generally provides enough force to position the moving member 52 in the forward direction to or past the minimum space requirement. When a hand held electronic device 12 is inserted into the opening 16 between the front wall 54 and the moving member 52, the moving member 52 is driven backwards against the spring force. In some cases, the moving member 52 and front wall 54 may include chamfers 112 for helping guide the end of the hand held electronic device 12 between the moving member 52 and the front wall 54. Once the hand held electronic device 12 is set in place, the spring action helps hold the device 12 in the opening 16, i.e., the spring provides a force that pushes the device against the opposing side of the opening thereby holding the electronic device in the opening. In a manner of speaking, the opening 16 is therefore self-adjusting, i.e., the moving member automatically adjusts to the size of the device when the device is placed in the opening.

Figure 8A:
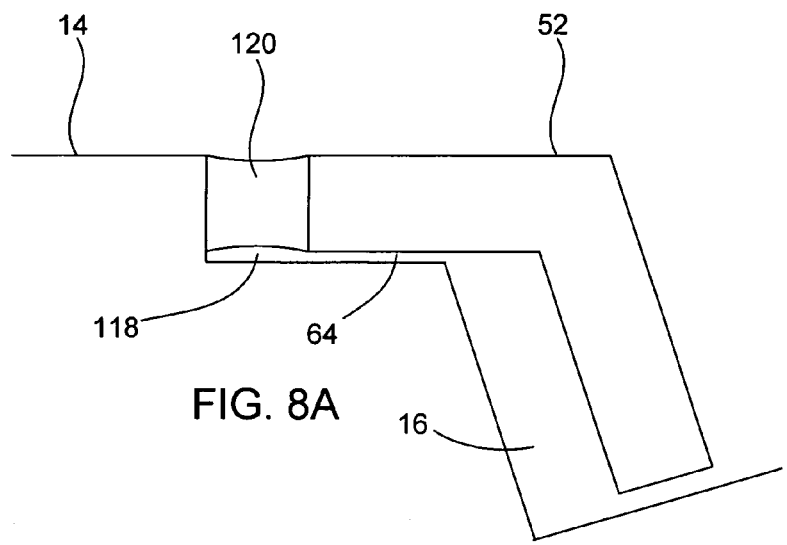
FIGS. 8A-8C are various side views, in cross section, of a universal docking station including a cover, in accordance with several embodiments of the present invention.
Figure 8B:
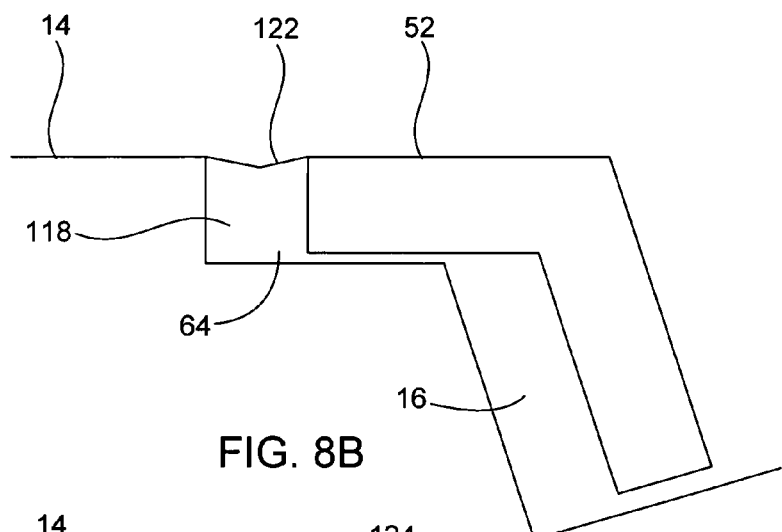
Figure 8C:
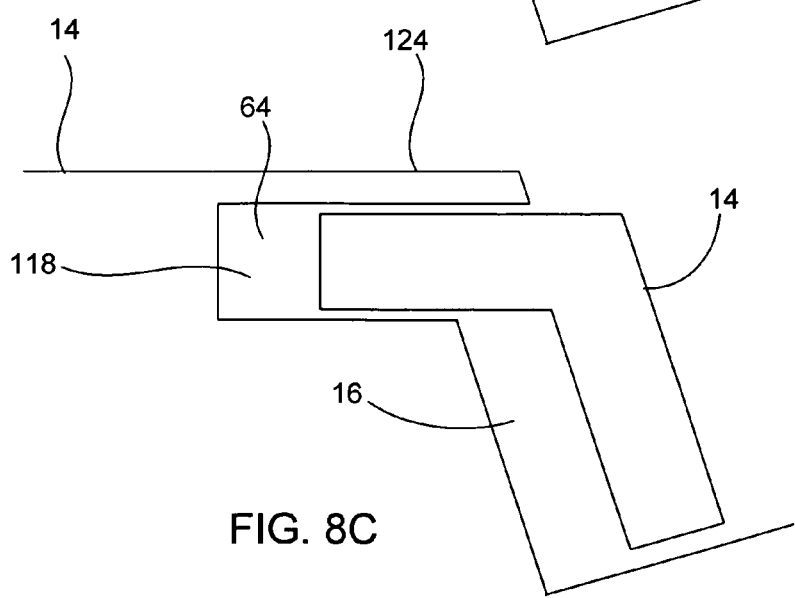

In another embodiment, the docking station 10 includes a cover for the gap created between the end of the moving member 52 and the back of the recess 64 when the moving member 52 is in a forward position. The gap is aesthetically unpleasing and it can be a location for gathering dust, which can impede the sliding action. FIGS. 8A-8C show several examples of mechanisms that can be used.

In FIG. 8A, a conforming member 120 is be placed inside the gap 118. When the moving member 52 moves forward, the conforming member 120 stretches or expands, and when the moving member 52 moves backwards, the conforming member 52 gets squished or retracted. The conforming member can be formed from a rubber or foam like material. In FIG. 8B, a shutter 122 is placed within the gap 118. When the moving member 52 moves forward, the shutter 122 unfolds, and when the moving member 52 moves backwards, the shutter 122 folds. In FIG. 8C, the top of the recess 64 may be enclosed by a top portion 124 of the base 14 thereby forming a void rather than a recess. When the moving member 52 moves forwards or backwards within the void, the top portion 124 of the base 14 covers the gap 118.

In another embodiment, the docking station 10 may include a door to cover the opening 16 when a device 12 is not inserted therein. The door may pivot about the moving member 52 and/or the front side 54 between a closed position and an open position. During insertion, the end of the hand held electronic device 12 presses against the door thereby causing the door to swing into the opening 16. In some cases the door may be spring biased in the closed position.

Figure 9A:
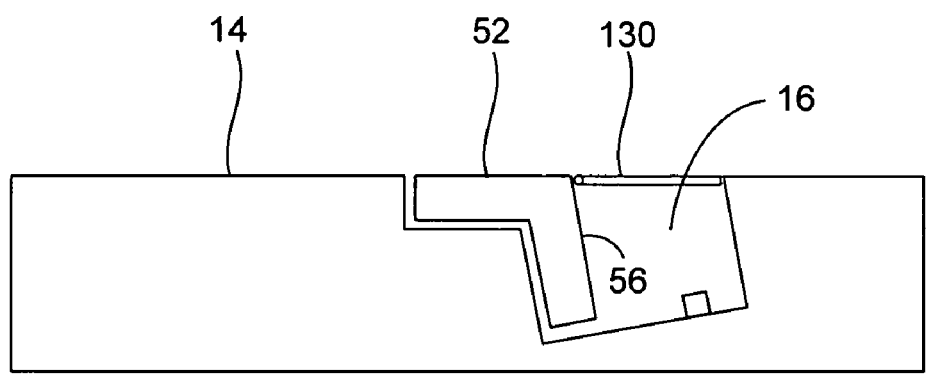
FIGS. 9A and 9B are side elevation views, in cross section, of a universal docking station including a door, in accordance with one embodiment of the present invention.
Figure 9B:
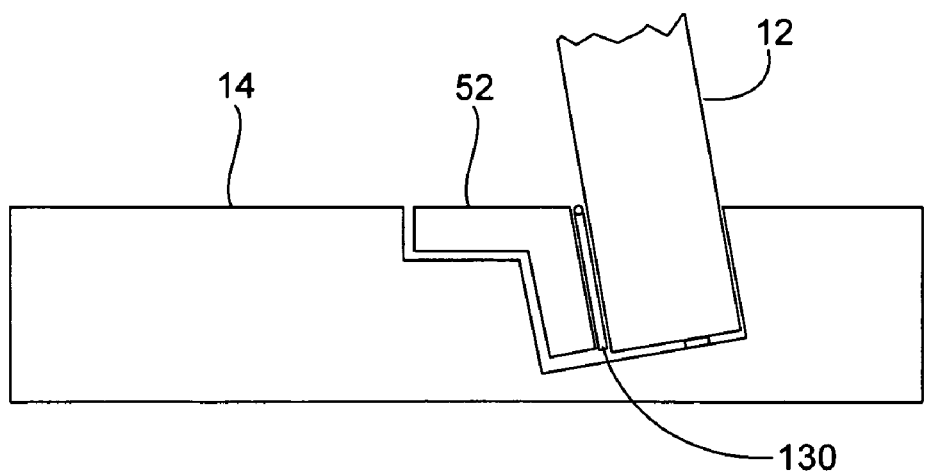
Figure 10:
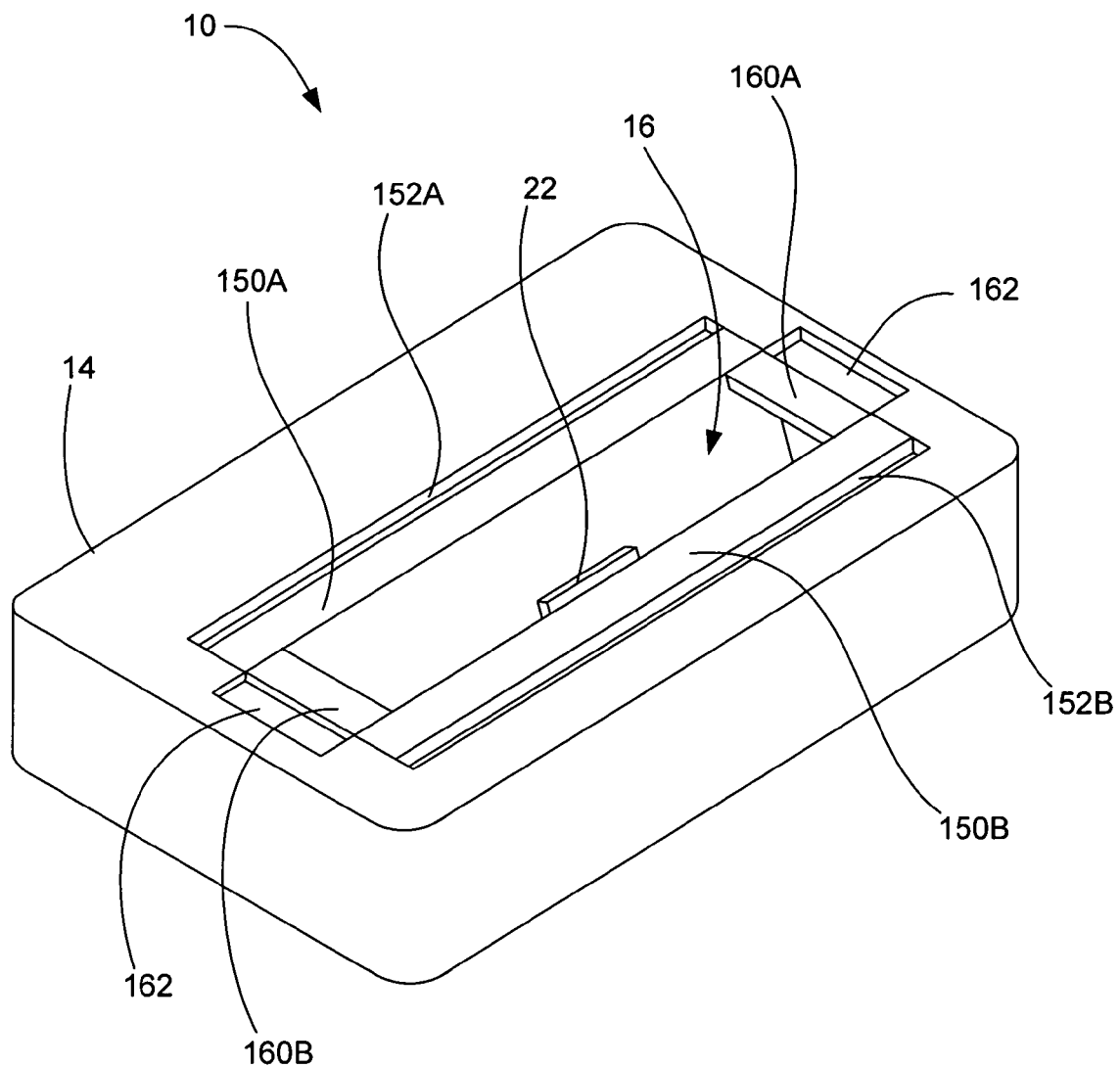
FIG. 10 is a perspective diagram of a universal docking station, in accordance with another embodiment of the present invention.
Figure 11:
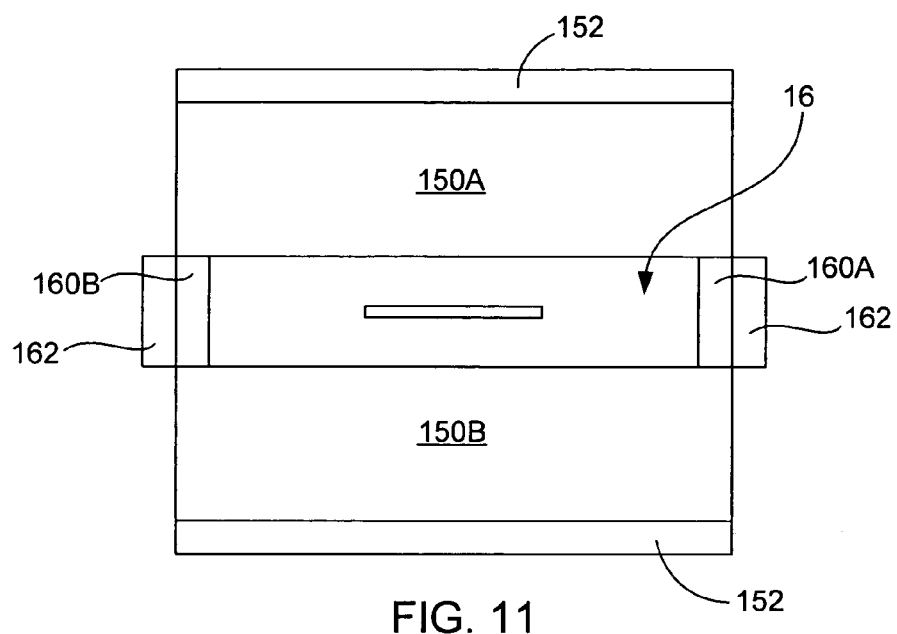
FIG. 11 is a top view of the universal docking station shown in FIG. 10, in accordance with another embodiment of the present invention.
Figure 12:
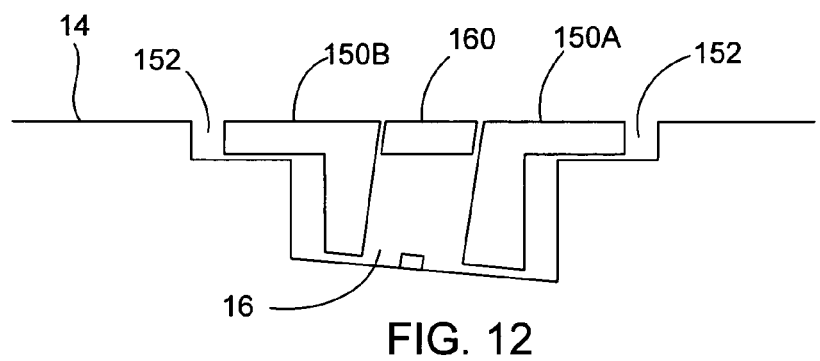
FIG. 12 is a side elevation view of the universal docking station shown in FIG. 10, in accordance with another embodiment of the present invention.
Figure 13:
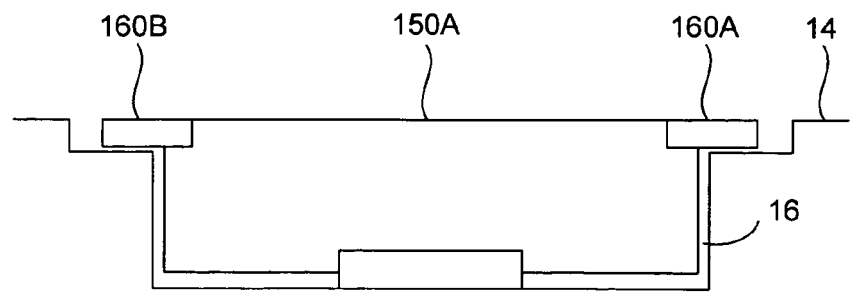
FIG. 13 is a front elevation view of the universal docking station shown in FIG. 10, in accordance with another embodiment of the present invention.

FIGS. 9A and 9B show one example of a docking station 10 with a door 130. In this particular embodiment, the door 130 is pivotably coupled to the moving member 52, and spring biased in the closed position (FIG. 9A). For example, a pivot pin may be used to couple the door to the moving member, and a torsion spring may provide the spring bias. As the hand held electronic device 12 is inserted into the opening 16, the door 130 swings inwardly towards the reference surface 56 of the moving member 52. Once set in place (FIG. 9B), the spring action may help hold the hand held electronic device 12 in the opening 16 (e.g., provides a force that pushes the hand held electronic device against the front surface).

Although each of the embodiments described above has been described separately, it should be noted that this is not a limitation and the each of the embodiments may be combined to further improve the docking station.

Referring to FIGS. 10-13, another embodiment of the present invention will be described in detail. In this particular embodiment, the docking station 10 includes at least two moving members 150A and 150B that move relative to the base 14 and that are positioned in an opposed relationship with one another. A first moving member 150A is configured to set the back position of the opening 16 and a second moving member 150B is configured to set the front position of the opening 16. Each of the moving members 150A and 150B may be configured and work like the single moving member described above including the various embodiments whether separately or combined. For example, moving member 150A may be slidably retained in a first recessed portion 152A, and moving member 150B may be slidably retained in a second recessed portion 152B.

The docking station 10 may further include wings or flaps 160A and 160B at the side surfaces of the opening 16. Like the moving members 150, the wings 160 are capable of moving into the opening 16. However, unlike the moving members 150, the wings 160 are configured to set the side positions of the opening 16 (e.g., width) rather than the front and back positions (e.g., thickness). The wings 160 may be configured to move above the moving members 150 or they may be configured to move between the moving members 150. If the later, the thickness of the wings 160 are typically slightly smaller than the minimum obtainable distance between the moving members 150A and 150B so that the motion of the wings 160 are not impeded by the moving members 150.

As should be appreciated, the wings 160 may be configured similarly to the moving members 150. For example, they may be formed as flanges and slide relative to the base 14. Alternatively, the wings 160 may be planar slats, and/or the wings 160 may rotate, pivot, or the like relative to the base 14. In the illustrated embodiment, the wings 160A and 160B embodied as planar slats are slidably retained in a recessed portion 162 on the top surface of the base 14 next to the opening 16. Furthermore, the thickness of the wings 160 are typically slightly smaller than the minimum obtainable distance between the moving members 150A and 150B so that the motion of the wings 160A and 160B are not impeded by the moving members 150 (see FIG. 12).

In one embodiment, the wings 160 are replaced by conforming members that are positioned within the opening 16, located at the sides of the opening 16, and between the two moving members 150A and 150B. The conforming members are formed from a material that has the ability to change its shape when forces are applied thereto. By way of example, the conforming members may be formed from foam like or rubber like materials.

Figure 14A:
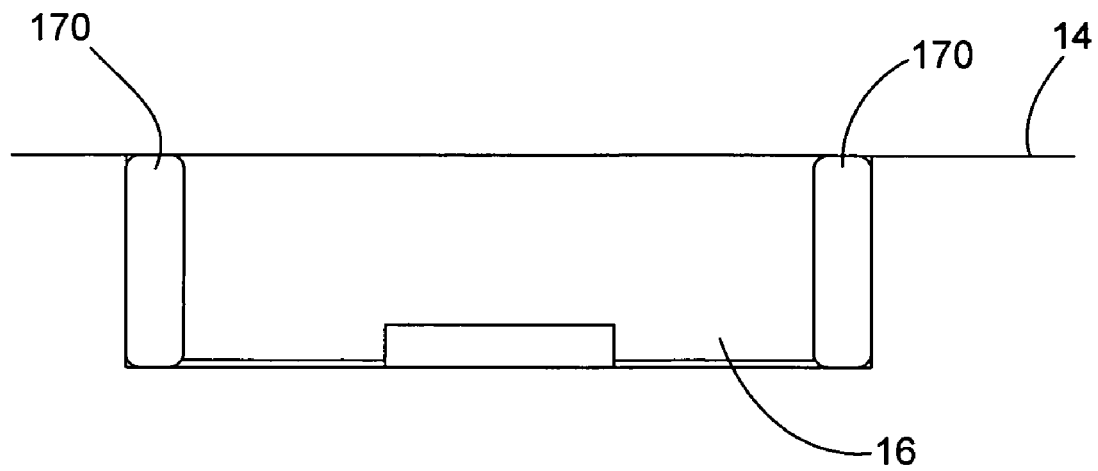
FIGS. 14A and 14B are front elevation views, in cross section, of a universal docking station, in accordance with another embodiment of the present invention.
Figure 14B:
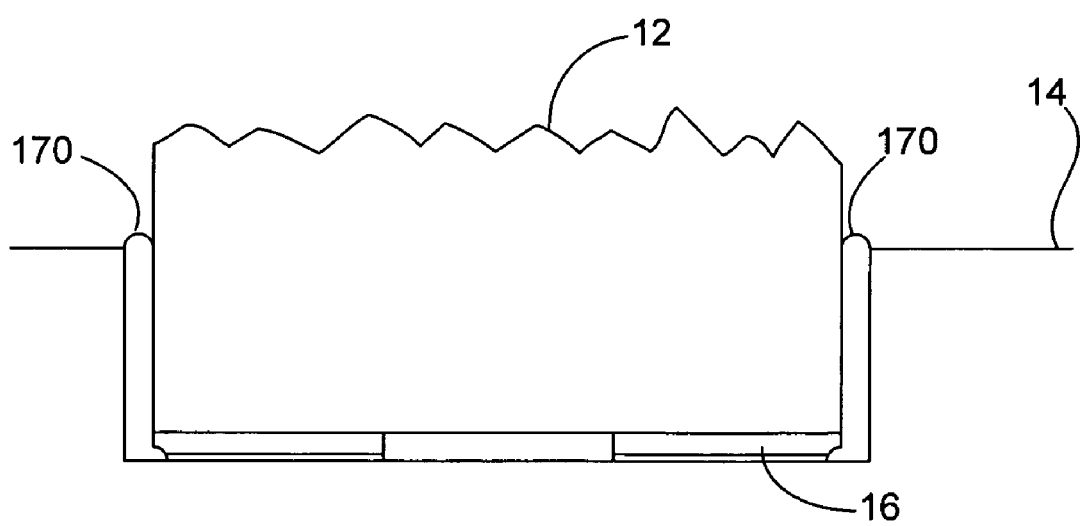

FIGS. 14A and 14B, show one example of a docking station 10 that includes conforming members 170. As shown, the conforming members 170 are positioned between the moving members 150A and 150B inside the opening 16. In most cases, the width of the conforming members 170 is configured to set the minimum desired width of the hand electronic devices 12 to be used with the docking station 10. When a device 12 is inserted into the opening 16 (FIG. 14B), the moving members 150 slide backwards and forwards to accommodate the thickness of the hand held electronic device 12, and the conforming members 170 compress to accommodate the width of the hand held electronic device 12. Because the moving members 150 move outwardly, the compressed conforming member 170 can shift its volume to fill this enlarged space thus relieving some of the pressure and creating a continuous surface at the top of the base 14 around the opening 16.

Figure 16:
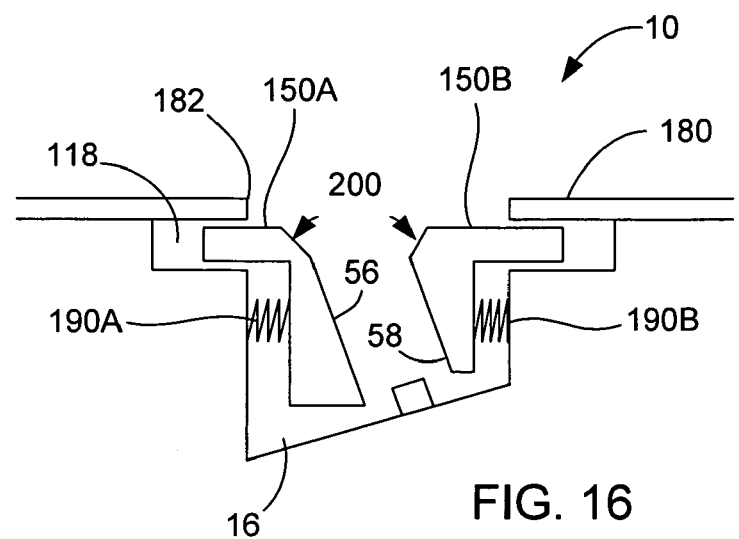
FIG. 16 is a side elevation view of the universal docking station shown in FIG. 15, in accordance with another embodiment of the present invention.
Figure 15:
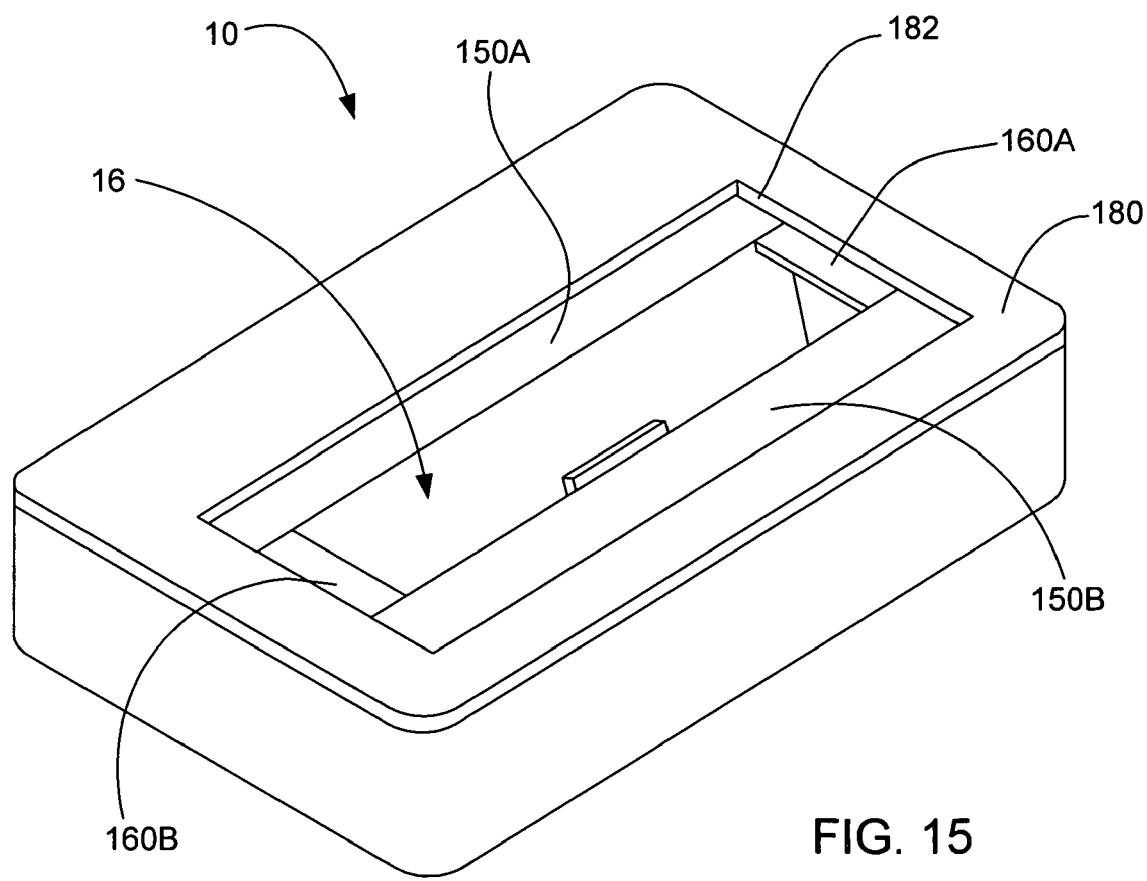
FIG. 15 is a perspective diagram of a universal docking station, in accordance with another embodiment of the present invention.

Referring to FIGS. 15 and 16, another embodiment of the present invention will be described in detail. This embodiment is similar to the embodiment shown in FIGS. 10-13, but with additional features. In this embodiment, the docking station 10 includes a top cover 180 that is positioned over the top surface of the base 14. The cover 180 essentially covers all the gaps 118 created at the interface between the moving members 150, wings 160 and base 14 thereby providing a more aesthetic appearance. The cover 180 includes an opening 182 that is sized and dimensioned for the largest space required by the hand held electronic devices 12 to be used in the docking station 10.

The docking station 10 also includes a pair of spring elements 190A and 190B, one for each moving member 150A and 150B. A first spring element 190A is configured to bias the back moving member 150A in a forward position, and a second spring element 190B is configured bias the front moving member 150B in a rearward position. The reference surfaces 56 and 58 of the moving members 150A and 150B are typically biased at a location that creates an opening 16 that is slightly smaller than the smallest hand held electronic device to be used in the docking station 10. In some cases, the moving members 150 each include a chamfer 200 for helping guide the end of the hand held electronic devices 12 into the opening 16. In the illustrated embodiment, the spring elements 190A and 190B are embodied as a compressive springs that are located between the moving members 150 and the walls of the opening 16. Although compressive springs are used, it should be noted that other spring elements can be used including leaf springs, tension springs, flexures, and deformable members. Although not shown, it should be noted that in some cases the wings too may be spring biased by spring elements.

Figure 17A:
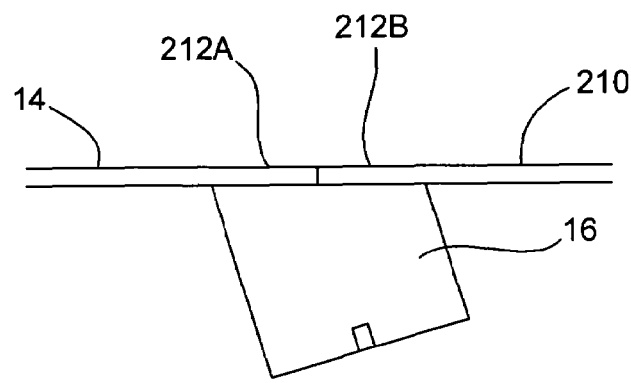
FIGS. 17A-17C are side elevation views of a universal docking station, in accordance with another embodiment of the present invention.
Figure 17B:
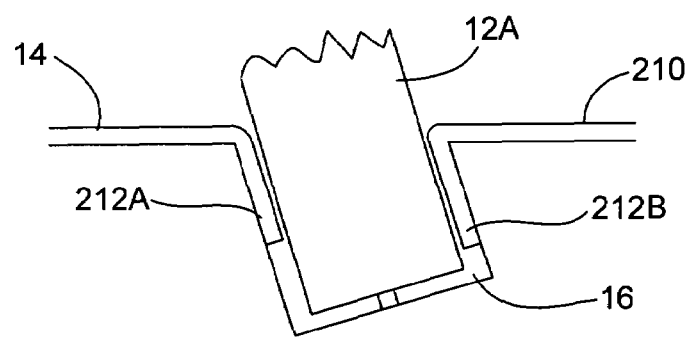
Figure 17C:
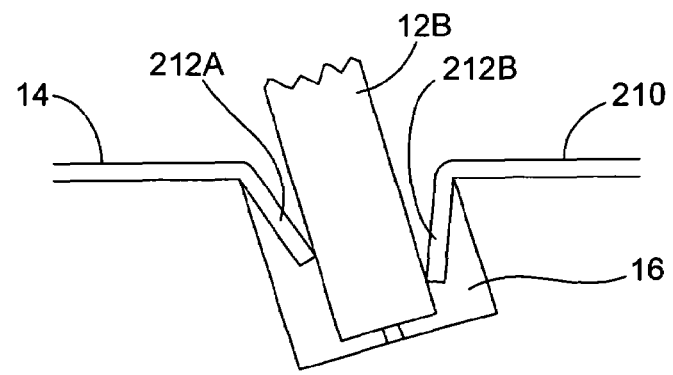

Referring to FIGS. 17A-17C, another embodiment of the present invention will be described in greater detail. In this particular arrangement, the docking station 10 includes a top cover 210 consisting of a pair of opposed flexures 212A and 212B that are capable of bending into the opening 16. The top cover 210 is positioned over the top surface of the base 14, and the flexures 212 are aligned over the opening 16. When a hand held electronic device 12 is pushed against the flexures 212 (FIGS. 17B and 17C), the flexures 212 bend into the opening 16. When enough force is applied, the flexures 212 bend over the sides of the device 12 thereby forming an opening 16 for the electronic device 12 to be inserted through. Once the device 12 is inserted, the flexures 212 may hold the device 12 in place via a pinching action. As shown in FIG. 17B, a thicker device 12A pushes the flexures 212 against the sides of the opening 16. As shown in FIG. 17C, a thinner device 12B does not push the flexures 212 all the way against the sides. By way of example, the top cover 210 may be formed from a thin plastic material, and the flexures 212 can be created by making incisions in the top cover 210. A similar arrangement can be used for the wings.

Figure 18A:
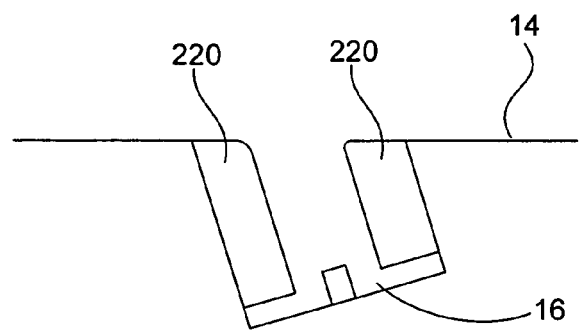
FIGS. 18A-18C are side elevation views of a universal docking station, in accordance with another embodiment of the present invention.
Figure 18B:
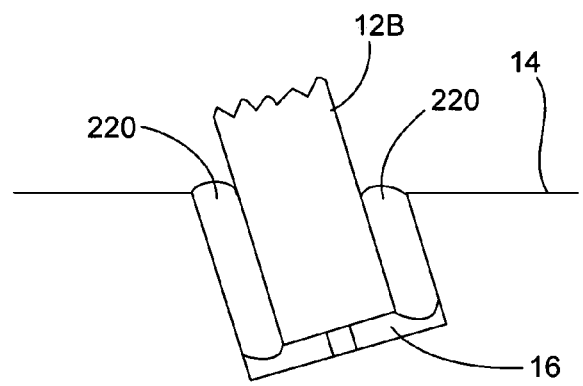
Figure 18C:
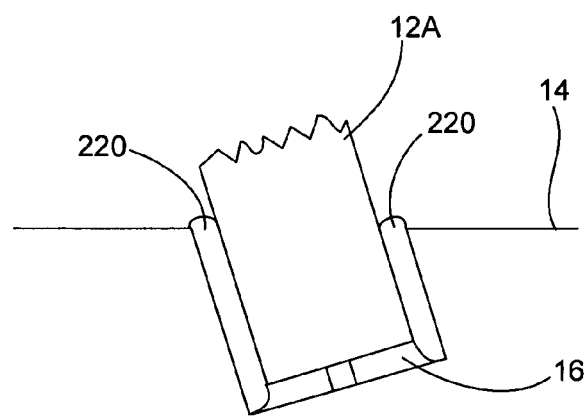

Referring to FIGS. 18A-18C, another embodiment of the present invention will be described in greater detail. In this particular arrangement, the docking station 10 includes one or more conforming members 220 placed on the inside surfaces of the opening 16. The conforming members 220 can be placed on one side or multiple sides. In the illustrated embodiment, the conforming member 220 is a placed on all sides of the opening such that it completely surrounds the opening (e.g., forms a ring). The conforming member 220 is formed from a compliant material that is capable of expanding and compressing to accommodate hand held electronic devices 12 with different sizes and shapes.

As shown in FIG. 18B, the thinner device 12B only slightly compresses the conforming member 220 to accommodate the thickness of the hand held electronic device 12B. As shown in FIG. 18C, the thicker device 12A heavily compresses the conforming member 220 to accommodate the thickness of the hand held electronic device 12A. As should be appreciated, the conforming member 220 provides a biasing force that helps hold the device in the opening 16. The conforming member 220 essentially squeezes the hand held electronic device 12 thereby holding it in place. By way of example, the conforming member may be formed from a foam or rubber like material.

Figure 19:
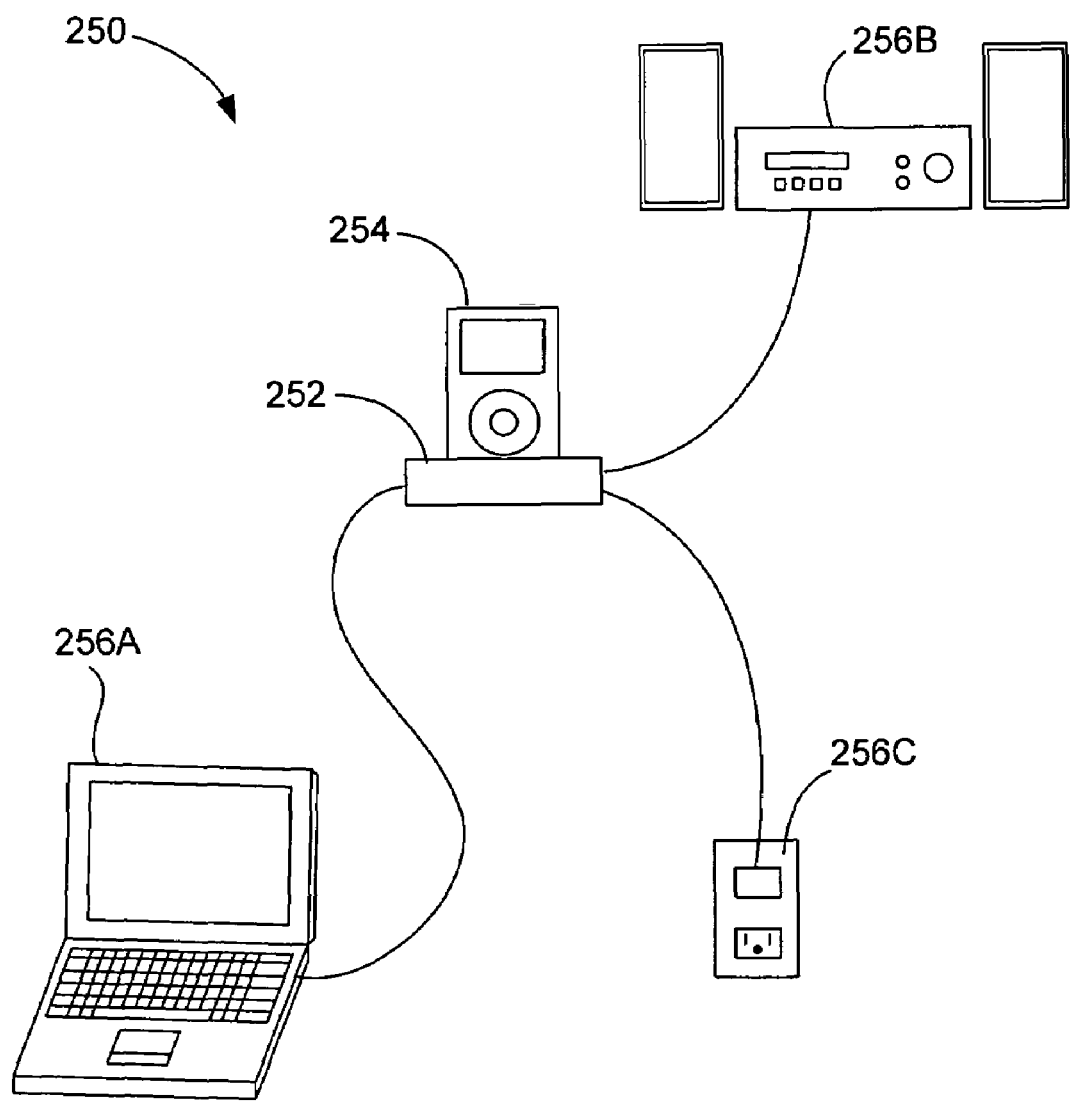
FIG. 19 is a simplified diagram of a system utilizing a universal docking station, in accordance with another embodiment of the present invention.

FIG. 19 is a simplified diagram of a system 250 utilizing a universal docking station 252, in accordance with one embodiment of the present invention. The universal docking station 252 may correspond to any of those previously described. The universal docking station 252 allows a user to easily connect portable electronic devices of various sizes and shapes 254 to other devices or systems 256 that are not usually a part of the portable electronic devices 254. The user simply plugs the portable electronic device 254 into the docking station 252 so that the portable electronic device 254 can communicate with all the devices or systems 256 coupled to the docking station 252. The docking station frees the user from having to separately plug and unplug their portable electronic devices 254 into other devices and systems 256 each time they want to use the portable electronic device 254 at a fixed location such as home, office or in the car.

By way of example, the portable electronic devices 254 may correspond to cellular phones, cameras, media players, game players and/or the like. Furthermore, the other devices and systems 256 may include personal computers such as desktops or laptops, audio systems including such components as tuners and amplifiers, video systems including such components as televisions, power sources such as a conventional AC outlet or a car DC outlet, I/O devices such as monitors, printers, speakers, keyboards, and/or the like. The other devices and systems 256 may also include other portable electronic devices or other docking stations.

In order to connect to the devices and systems 256, the docking station 252 typically includes various I/O ports and/or cables located within or emanating from the peripheral surface of the base of the docking station 252. These components are operatively coupled to the connector located within the opening of the base of the docking station 252. This may for example be accomplished through flex cables and a printed circuit board. The ports and cables may be associated with data, power and the like. In some cases, the connector is coupled to a single port or cable and in other cases, the information being passed through the connector is split into multiple ports or cables. In one embodiment, the docking station 252 includes a video port such as an S-Video port, an audio out plug, and a data port that includes power, USB and/or Firewire, and audio functionality among others.

When using ports and plugs, the docking station is typically coupled to the other devices and systems through a cable. The first end of the cable is engaged with the ports on the surface of the base of the docking station 252 and the second end of the cable is connected to a port associated with the other devices and systems 256. Through these various connections, the portable electronic device 254 can communicate with the other devices and systems 256, i.e., power and data may be passed therebetween.

In the illustrated embodiment, the portable electronic devices 254 with varying sizes and shapes correspond to a set of music players such as the iPod manufactured by Apple Computer of Cupertino, Calif. The user can use the music player 254 when on the move and when at home, work or in the car use the docking station 252 to easily couple the music player 254 to devices such as a personal computer 256A in order to upload or download music, an audio system or speaker set 256B to listen to the music and in some cases a power source 256C so that the music player 254 can be charged. Each of these devices 256 can be connected separately or together to the universal docking station 252.

Although the invention has been primarily directed at docking stations that receive the bottom end of the hand held electronic devices, it should be noted that this is not a limitation and that the invention may be directed at other configurations. For example, the docking station may be configured to receive the back end of the hand held electronic device rather than the bottom end.

Figure 20:
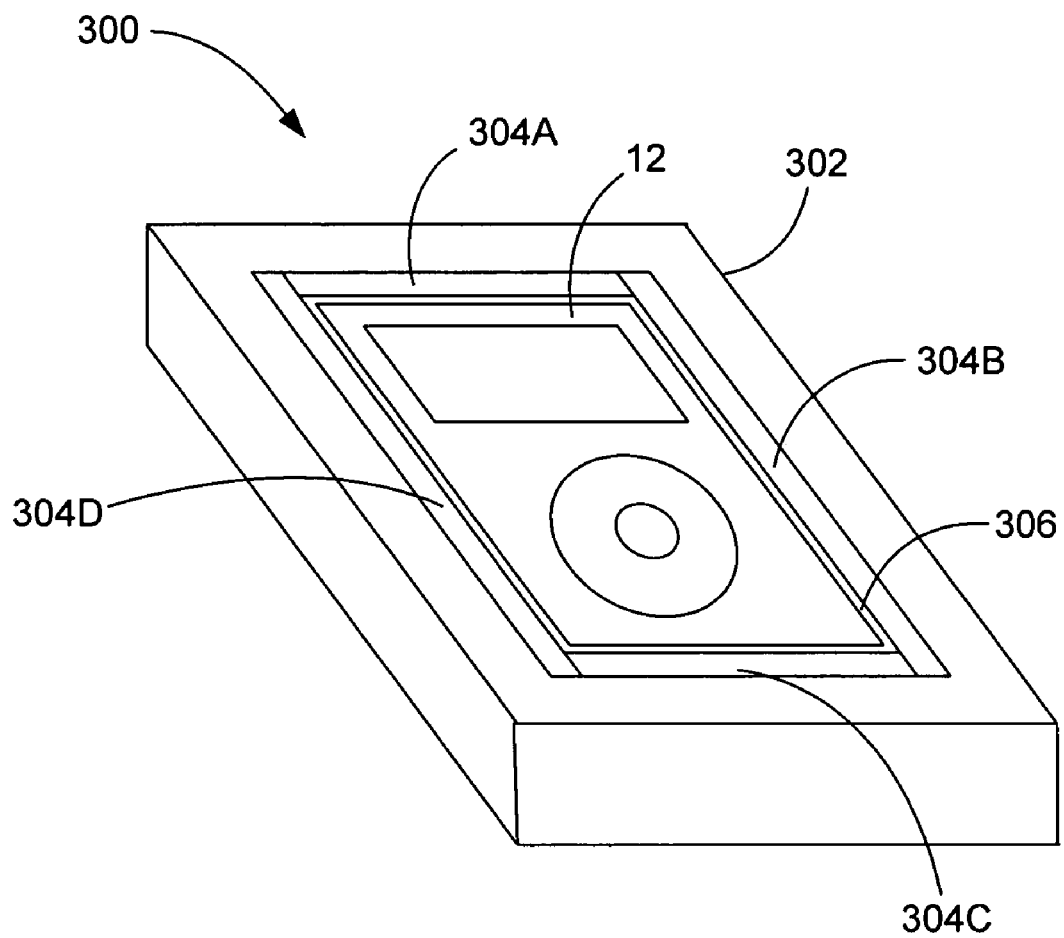
FIG. 20 is a perspective diagram of a universal docking station, in accordance with another embodiment of the present invention.

FIG. 20 shows one example of a docking station 300 that is capable of receiving the back end of the hand held electronic device 12. Like the docking stations described previously, the docking station 300 includes a base 302 having one or more adjustable members 304 that have the ability to change the size and/or shape of an opening 306 for any number of hand held electronic devices 12 of various shapes and sizes. For example, the adjustable members 304 may expand outwardly to create an opening 306 that accommodates larger hand held devices 12 and they may retract inwardly to create an opening that accommodates smaller hand held devices 12. While the adjustable members 304 work similarly to the embodiments described above, in this particular arrangement, the adjustable members adjust for different widths and/or heights rather than different thicknesses and widths.

Furthermore, although the invention has been primarily directed at stand alone docking stations, it should be noted that this is not a limitation and that the invention may be directed at integrated docking stations. As mentioned previously, integrated docking stations are integrated or built into other devices such as personal computers, sound systems, video systems, recording equipment, communication equipment and peripheral devices such as printers, keyboards and the like. In the integrated docking station, the base is typically provided by the housing of the device that it is integrated with, i.e., the docking station utilizes the housing of the device rather than having its own housing. The openings of the integrated docking stations, whether configured for receiving the bottom or back ends or other ends, are typically externally accessible to the hand held electronic device so that the hand held electronic device can be easily inserted or removed from the opening. Any of the previously described adjustable members capable of accommodating hand held electronic device of various sizes and shapes may be used.

Figure 21:
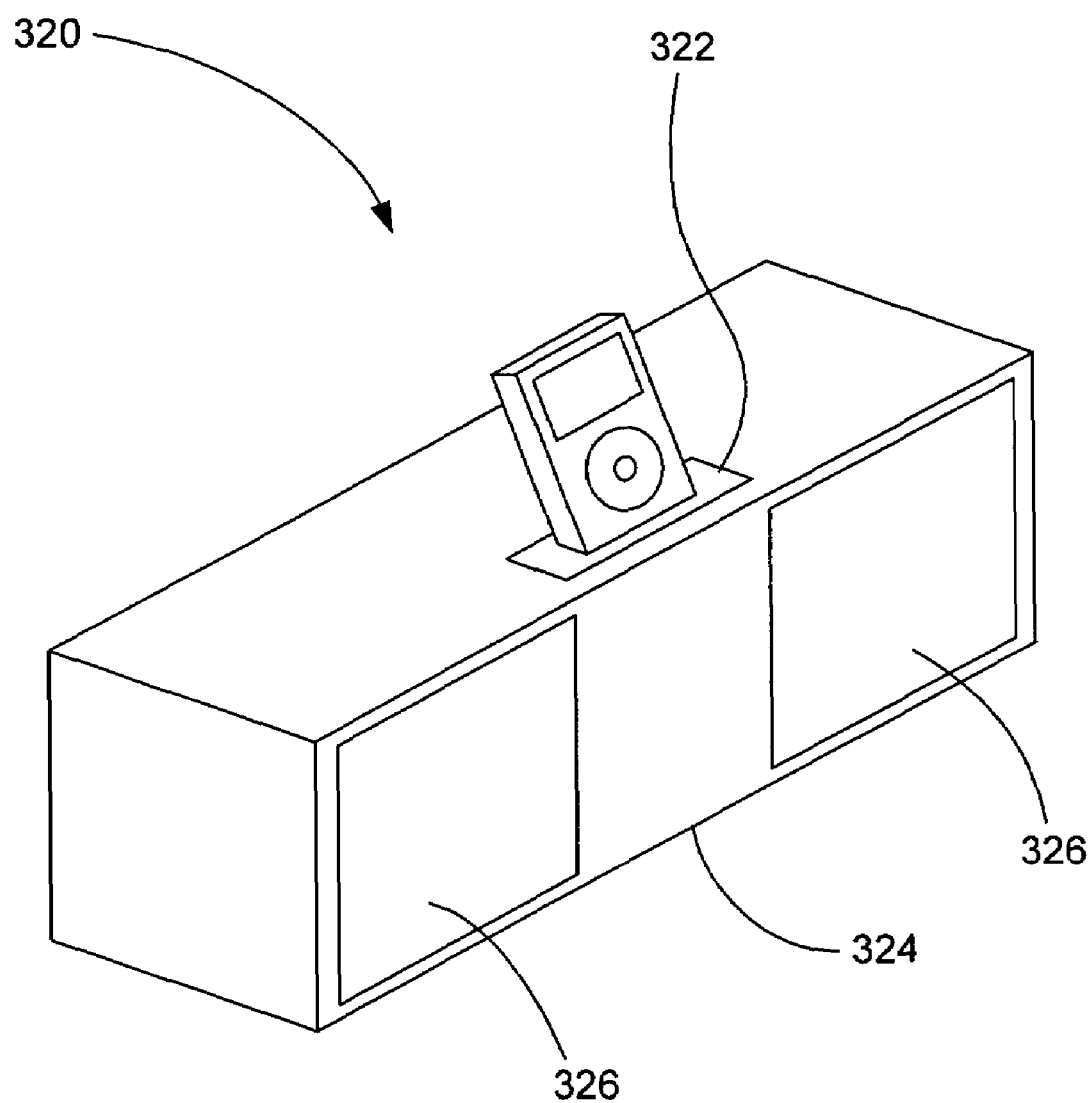
FIG. 21 is a perspective diagram of a sound system utilizing a universal docking station, in accordance with one embodiment of the present invention.

FIG. 21 is a perspective view of a sound system 320 with an integrated universal docking station 322, in accordance with one embodiment of the present invention. The sound system 320 may be widely varied. For example, it may be a substantially fixed or portable unit. In the illustrated embodiment, the sound system is a boom box that includes a base 324 and a pair of speakers 326. The universal docking station 322 is integrated within the base 324 and allows various hand held electronic devices 12 especially a music player such as the iPod to communicate with the internal circuitry of the base 324 so that music stored on the music player can be broadcast on the boom box via the speakers 326. The universal docking station 322 can be any of those previously described. As such, the universal docking station 322 includes an adjustable opening 328 that may be placed anywhere on the base 324. In the illustrated embodiment, the universal docking station 322 is placed on the top surface of the base 324.

As mentioned, handheld devices come in a variety of shapes and sizes, and may be positioned in the docking station in a variety of orientations including for example substantially vertical (or tilted) or substantially horizontal. Although not a limitation of the present invention, in one embodiment, the adjustable members of the substantially vertically oriented docking stations are configured to accommodate handheld devices having a width of between for example about 2.0 to about 2.4 inches, and/or a depth of between for example about 0.5 to about 0.75 inches. By way of example, these ranges allow the docking station to accept handheld devices that are 2.0 inches×0.5 inches, 2.4 inches×0.57 inches, 2.4× 0.63 inches, 2.4 inches×0.69 inches and/or 2.4 inches×0.75 inches. Again, although not a limitation of the present invention, in another embodiment, the adjustable members of the substantially horizontally oriented docking stations are configured to accommodate handheld devices having a width of between for example about 2.0 to about 2.4 inches, and/or a height of between for example about 3.6 inches to about 4.1 inches. By way of example, these ranges allow the docking station to accept handheld devices that are 2.0 inches×3.6 inches, and/or 2.4 inches×4.1 inches.

While this invention has been described in terms of several preferred embodiments, there are alterations, permutations, and equivalents, which fall within the scope of this invention.

For example, although the adjustable members of the present invention can be used to retain the hand held electronic device in the opening, this is not a limitation and other components may be used alternatively or in addition to the adjustable member. By way of example, snaps, latches, clamps, magnets may be used to hold the hand held electronic device within the opening as well as the friction coupling found between the connector and ports. An ejection mechanism may additionally be used to release the hand held electronic device from the opening, i.e., to overcome any holding forces as for example holding forces created by the friction coupling between the connector and port.

It should also be noted that there are many alternative ways of implementing the methods and apparatuses of the present invention.

For example, the moving members may include nested components capable of telescoping in a particular direction. Further, the moving members may have a leading edge that is shaped like the surface of a device or leading edge that include a seal that adapts to the shape of the device. Further still, the moving members may be operatively coupled to one another through gears so that they move simultaneously. The gears may be driven by a motor, and the docking station may include sensors for detecting the location of the device so that the moving members can be moved into engagement with the device In addition, the sliding members may be clicked and secured to set positions that correspond to particular dimensions of a group of handheld electronic devices such as the iPod manufactured by Apple Computer. Moreover, for each device the adjustable members may be adjusted to different distances from the sides of the recess so that the port on the device is centered on the connector of the docking station. Alternatively, the handheld devices may include a port that is offset relative to other handheld devices so that the port on the device is centered on the connector of the docking station.

It is therefore intended that the following appended claims be interpreted as including all such alterations, permutations, and equivalents as fall within the true spirit and scope of the present invention.

What is claimed is:

1. A universal docking station, comprising:
a base including a recess that forms an opening for receiving a handheld device, the recess having sides that surround the sides of the handheld device when the handheld device is received by the opening; and
a plurality of adjustable members disposed at least partially within the recess, and having the ability to change a size and shape of the opening for handheld devices of various sizes and shapes,
wherein one of the plurality of adjustable members expands or retracts within the recess along a first axis to change the size of the opening in a first direction thereby accommodating a first dimension of the handheld devices, and wherein another of the plurality of adjustable members expands or retracts within the recess along a second axis to change the size of the opening in a second direction thereby accommodating a second dimension of the handheld devices, the first axis being orthogonal to the second axis,
wherein one or more of the plurality of adjustable members are sliding members that slide relative to the base in order to accommodate handheld devices with varying sizes and shapes.

2. The universal docking station as recited in claim 1 wherein one or more of the plurality of adjustable members expands or retracts within the recess to change the size and shape of the opening in order to accommodate handheld devices with varying thicknesses.

3. The universal docking station as recited in claim 1 wherein one or more of the plurality of adjustable members expands or retracts within the recess to change the size and shape of the opening in order to accommodate handheld devices with varying widths.

4. The universal docking station as recited in claim 1 wherein one or more of the plurality of adjustable members expands or retracts within the recess to change the size and shape of the opening in order to accommodate handheld devices with varying heights.

5. The universal docking station as recited in claim 1 wherein the first and second dimensions are selected from thickness, width and height.

6. The universal docking station as recited in claim 5 wherein the first dimension is the width of the handheld device, and the second dimension is the thickness of the handheld device, and wherein the plurality of adjustable members are configured to accommodate widths of between substantially 2.0 inches and about 2.4 inches, and thicknesses of between substantially 0.5 inches and about 0.75 inches.

7. The universal docking station as recited in claim 5 wherein the first dimension is the width of the handheld device, and the second dimension is the height of the handheld device, and wherein the adjustable members are configured to accommodate widths of between substantially 2.0 inches and about 2.4 inches, and heights of between substantially 3.6 inches and about 4.1 inches.

8. The universal docking station as recited in claim 1 wherein one or more of the plurality of adjustable members are flexure members that bend in order to accommodate handheld devices with varying sizes and shapes.

9. The universal docking station as recited in claim 1 wherein one or more of the plurality of adjustable members are conforming members that deform in order to accommodate handheld devices with varying sizes and shapes.

10. A universal docking station, comprising:
a base having an opening that is partially recessed in the base, the opening having four sides and a bottom, the opening being configured to receive a hand held electronic device, the opening including an interface that operatively couples the hand held electronic device to the universal docking station when the hand held electronic device is inserted into the opening, the base including one or more adjustable members that have the ability to change the dimensions of the opening, the one or more adjustable members expanding the opening outwardly to accommodate larger hand held devices and retracting the opening inwardly to accommodate smaller devices,
wherein the one or more adjustable members are located on all four sides of the opening, and wherein the one or more adjustable members are sliding members that slide relative to the base in order to accommodate handheld devices with varying sizes and shapes.

11. The universal docking station as recited in claim 10 wherein the universal docking station is a stand alone unit that operatively couples to an external electronic device through wired or wireless connections.

12. The universal docking station as recited in claim 10 wherein the universal docking station is integrated into an electronic device.

13. The universal docking station as recited in claim 10 wherein the base includes a first adjustable member located on a first side of the opening and a second adjustable member that is located on a second side of the opening opposite the first side.

14. The universal docking station as recited in claim 13 further including a third adjustable member located on a third side of the opening and a fourth adjustable member located on a fourth side of the opening opposite the third side.

15. The universal docking station as recited in claim 10 wherein the universal docking station includes a door to cover the opening when the hand held electronic device is not inserted therein.

16. A universal docking station for a handheld device, comprising:
 a base with a recess having an adjustable opening;
 a first sliding member at least partially located within the recess, and being configured to slide relative to the base along a first axis, the first sliding member sliding between a retracted position that forms a large opening in the recess for receiving larger handheld devices, and an expanded position that forms a small opening in the recess for receiving smaller handheld devices; and
 a second sliding member,
 wherein the first sliding member is located on a first side of the recess and the second sliding member is located on a second side of the recess opposite the first side, and wherein the first and second sliding members move along the first axis in directions towards and away from one another in order adjust the distance of the adjustable opening.

17. The universal docking station as recited in claim 16 wherein the first sliding member is located on a first side of the recess, and wherein the first sliding member is configured to move linearly towards a second side of the recess that is opposite the first side in order to adjust the distance of the opening.

18. The universal docking station as recited in claim 16 wherein the second sliding member is at least partially located within the recess, and is configured to slide relative to the base along the first axis, the second sliding member sliding between a retracted position that forms a large opening in the recess for receiving larger handheld devices, and an expanded position that forms a small opening in the recess for receiving smaller handheld devices, the second sliding member cooperating with the first sliding member in order to adjust the distance of the opening.

19. The universal docking station as recited in claim 16 wherein the first and second sliding members span a width of the adjustable opening, and are configured to move forwards and backwards along the first axis in order to accommodate hand held electronic devices with varying thicknesses, the first and second sliding members setting the maximum distance of the adjustable opening when they are both placed in the retracted position, the first and second sliding members setting the minimum distance of the adjustable opening when they are both placed in the expanded position.

20. The universal docking station as recited in claim 16 wherein the first sliding member takes the form of a flange having a substantially horizontal upper section and a substantially vertical lower section, the upper section being seated within a recessed portion in a surface of the base next to the recess, the lower section extending into the recess such that it drapes around a side of the recess, the lower section acting as a wall of the recess and providing a reference surface for supporting the hand held electronic device when the electronic device is inserted into the recess.

21. The universal docking station as recited in claim 16 wherein the universal docking station includes a locking device for holding a position of the first sliding member.

22. The universal docking station as recited in claim 16 wherein the universal docking station includes a positioning mechanism for moving the first sliding member to a position between the retracted and expanded positions.

23. The universal docking station as recited in claim 16 wherein the universal docking station includes one or more spring elements for biasing the first and second sliding member in the expanded position.

24. A universal docking station, comprising:
 a first adjustable member located on a first side of an opening and a second adjustable member located on a second side of the opening, the second side being opposite the first side, the first and second adjustable members cooperating to adjust a size of the opening in order to accommodate handheld electronic devices of various sizes,
 wherein the first and second adjustable members move along a first axis in a linear direction towards and away from one another, and
 wherein at least one of the first and second adjustable members is a sliding member that slides relative to a base in order to accommodate handheld devices with varying sizes and shapes.

25. The universal docking station as recited in claim 24 wherein the first and second adjustable members are spring biased in a direction towards one another.

26. The universal docking station as recited in claim 24 further including a third adjustable member located on a third side of the opening and a fourth adjustable member located on a fourth side of the opening, the fourth side being opposite the third side.

27. The universal docking station as recited in claim 26 wherein the first and second adjustable members move along a first axis in a linear direction towards and away from one another, and wherein the third and fourth adjustable members move along a second axis in a linear direction towards and away from one another, the first and second axes being orthogonal.

28. The universal docking station as recited in claim 27 wherein the first and second adjustable members are spring biased in a direction towards one another, and wherein the third and fourth adjustable members are spring biased in a direction towards one another.

29. A sound system, comprising:
 a base with an integrated universal docking station, the universal docking station being configured to receive handheld music players, the universal docking station including an adjustable opening for accommodating handheld music players of various sizes and shapes, the adjustable opening having first and second adjustable members capable of moving along a first axis in a direction towards and away from one another; and
 one or more speakers connected to the base,
 wherein at least one of the first and second adjustable members is a sliding member that slides relative to the base in order to accommodate handheld devices with varying sizes and shapes.

30. The sound system as recited in claim 29 wherein the adjustable opening adjusts along a first axis to distances between about 0.5 inches to about 0.75 inches.

31. The sound system as recited in claim 30 wherein the adjustable opening adjusts along a second axis to distances between about 2.0 inches to about 2.4 inches.

32. The sound system as recited in claim 29 wherein the adjustable opening adjusts along a first axis to distances between about 3.6 inches to about 4.1 inches.

33. The sound system as recited in claim 32 wherein the adjustable opening adjusts along a second axis to distances between about 2.0 inches to about 2.4 inches.

* * * * *

UNITED STATES PATENT AND TRADEMARK OFFICE
CERTIFICATE OF CORRECTION

PATENT NO. : 7,719,830 B2  
APPLICATION NO. : 11/125883  
DATED : May 18, 2010  
INVENTOR(S) : Richard P. Howarth et al.

Page 1 of 1

It is certified that error appears in the above-identified patent and that said Letters Patent is hereby corrected as shown below:

In column 18, lines 44-46, in Claim 27, after "claim 26" delete "wherein the first and second adjustable members move along a first axis in a linear direction towards and away from one another, and".

Signed and Sealed this  
Eighth Day of November, 2011

David J. Kappos  
*Director of the United States Patent and Trademark Office*